United States Patent
Nagavarapu et al.

(10) Patent No.: US 11,033,854 B2
(45) Date of Patent: Jun. 15, 2021

(54) APPARATUS AND SYSTEM FOR SWING ADSORPTION PROCESSES

(71) Applicant: ExxonMobil Upstream Research Company, Spring, TX (US)

(72) Inventors: Ananda Krishna Nagavarapu, Houston, TX (US); William Barnes, Spring, TX (US); Bennett D. Marshall, Conroe, TX (US); Bruce T. Kelley, Porter, TX (US); Robert A. Johnson, Doylestown, PA (US)

(73) Assignee: ExxonMobil Upstream Research Company, Spring, TX (US)

( * ) Notice: Subject to any disclaimer, the term of this patent is extended or adjusted under 35 U.S.C. 154(b) by 182 days.

(21) Appl. No.: 16/545,681

(22) Filed: Aug. 20, 2019

(65) Prior Publication Data

US 2019/0381444 A1    Dec. 19, 2019

Related U.S. Application Data

(62) Division of application No. 15/496,576, filed on Apr. 25, 2017, now Pat. No. 10,427,091.

(Continued)

(51) Int. Cl.
*B01D 53/06* (2006.01)
*B01D 53/047* (2006.01)
(Continued)

(52) U.S. Cl.
CPC ....... *B01D 53/047* (2013.01); *B01D 53/0446* (2013.01); *B01D 53/0462* (2013.01);
(Continued)

(58) Field of Classification Search
CPC ............... B01D 53/04; B01D 53/0446; B01D 53/0462; B01D 53/047; B01D 53/261;
(Continued)

(56) References Cited

U.S. PATENT DOCUMENTS

| 1,868,138 A | 7/1932 | Fisk |
| 3,103,425 A | 9/1963 | Meyer |

(Continued)

FOREIGN PATENT DOCUMENTS

| EP | 0257493 | 2/1988 |
| EP | 0426937 | 5/1991 |

(Continued)

OTHER PUBLICATIONS

U.S. Appl. No. 16/252,975, filed Jan. 21, 2019, Krishna Nagavarapu et al.

(Continued)

*Primary Examiner* — Frank M Lawrence, Jr.
(74) *Attorney, Agent, or Firm* — ExxonMobil Upstream Research Company—Law Department

(57) ABSTRACT

Provided are apparatus and systems for performing a swing adsorption process. This swing adsorption process may involve performing a startup mode process prior to beginning a normal operation mode process to remove contaminants from a gaseous feed stream. The startup mode process may be utilized for swing adsorption processes, such as TSA and/or PSA, which are utilized to remove one or more contaminants from a gaseous feed stream.

15 Claims, 4 Drawing Sheets

Related U.S. Application Data

(60) Provisional application No. 62/343,426, filed on May 31, 2016.

(51) Int. Cl.
  *B01D 53/04* (2006.01)
  *B01D 53/26* (2006.01)
  *C10G 5/02* (2006.01)
  *C10G 5/06* (2006.01)
  *F25J 3/08* (2006.01)

(52) U.S. Cl.
  CPC .......... *B01D 53/06* (2013.01); *B01D 53/261* (2013.01); *C10G 5/02* (2013.01); *C10G 5/06* (2013.01); *F25J 3/08* (2013.01); *B01D 2256/24* (2013.01); *B01D 2257/504* (2013.01); *B01D 2257/80* (2013.01); *B01D 2259/40003* (2013.01); *B01D 2259/40043* (2013.01); *B01D 2259/40054* (2013.01); *B01D 2259/40056* (2013.01); *B01D 2259/40081* (2013.01); *C10G 2300/1025* (2013.01); *F25J 2205/60* (2013.01); *F25J 2205/64* (2013.01); *F25J 2205/70* (2013.01); *F25J 2215/04* (2013.01); *F25J 2215/60* (2013.01); *F25J 2220/66* (2013.01); *F25J 2220/68* (2013.01); *Y02C 20/40* (2020.08)

(58) Field of Classification Search
  CPC .............. B01D 53/053; B01D 2256/24; B01D 2257/504; B01D 2257/80; B01D 2259/40003; B01D 2259/40043; B01D 2259/40054; B01D 2259/40056; B01D 2259/40081; C10G 2300/1025; C10G 5/02; C10G 5/06; Y02C 10/08; Y02C 20/40; F25J 3/08; F25J 2205/60; F25J 2205/64; F25J 2205/70; F25J 2215/04; F25J 2215/60; F25J 2220/66; F25J 2220/68
  USPC .......... 96/121, 122, 126, 130, 134, 143, 146
  See application file for complete search history.

(56) References Cited

U.S. PATENT DOCUMENTS

| | | |
|---|---|---|
| 3,124,152 A | 3/1964 | Payne |
| 3,142,547 A | 7/1964 | Marsh et al. |
| 3,405,507 A * | 10/1968 | Spencer ................ B01D 53/04 95/146 |
| 3,508,758 A | 4/1970 | Strub |
| 3,594,983 A | 7/1971 | Yearout |
| 3,602,247 A | 8/1971 | Bunn et al. |
| 3,788,036 A | 1/1974 | Lee et al. |
| 3,967,464 A | 7/1976 | Cormier et al. |
| 4,187,092 A | 2/1980 | Woolley |
| 4,261,815 A | 4/1981 | Kelland |
| 4,324,565 A | 4/1982 | Benkmann |
| 4,325,565 A | 4/1982 | Winchell |
| 4,329,162 A | 5/1982 | Pitcher |
| 4,340,398 A | 7/1982 | Doshi et al. |
| 4,386,947 A | 6/1983 | Mizuno et al. |
| 4,421,531 A | 12/1983 | Dalton, Jr. et al. |
| 4,445,441 A | 5/1984 | Tanca |
| 4,461,630 A | 7/1984 | Cassidy et al. |
| 4,496,376 A | 1/1985 | Hradek |
| 4,512,779 A * | 4/1985 | Hay .................... B01D 53/053 95/100 |
| 4,631,073 A | 12/1986 | Null et al. |
| 4,693,730 A | 9/1987 | Miller et al. |
| 4,705,627 A | 11/1987 | Miwa et al. |
| 4,711,968 A | 12/1987 | Oswald et al. |
| 4,737,170 A | 4/1988 | Searle |
| 4,770,676 A | 9/1988 | Sircar et al. |
| 4,783,205 A | 11/1988 | Searle |
| 4,784,672 A | 11/1988 | Sircar |
| 4,790,272 A | 12/1988 | Woolenweber |
| 4,814,146 A | 3/1989 | Brand et al. |
| 4,816,039 A | 3/1989 | Krishnamurthy et al. |
| 4,877,429 A | 10/1989 | Hunter |
| 4,977,745 A | 12/1990 | Heichberger |
| 5,110,328 A | 5/1992 | Yokota et al. |
| 5,125,934 A | 6/1992 | Krishnamurthy et al. |
| 5,169,006 A | 12/1992 | Stelzer |
| 5,174,796 A | 12/1992 | Davis et al. |
| 5,224,350 A | 7/1993 | Mehra |
| 5,234,472 A | 8/1993 | Krishnamurthy et al. |
| 5,292,990 A | 3/1994 | Kantner et al. |
| 5,306,331 A | 4/1994 | Auvil et al. |
| 5,354,346 A | 10/1994 | Kumar |
| 5,365,011 A | 11/1994 | Ramachandran et al. |
| 5,370,728 A | 12/1994 | LaSala et al. |
| 5,486,227 A | 1/1996 | Kumar et al. |
| 5,547,641 A | 8/1996 | Smith et al. |
| 5,565,018 A | 10/1996 | Baksh et al. |
| 5,672,196 A | 9/1997 | Acharya et al. |
| 5,700,310 A | 12/1997 | Bowman et al. |
| 5,733,451 A | 3/1998 | Coellner et al. |
| 5,735,938 A | 4/1998 | Baksh et al. |
| 5,750,026 A | 5/1998 | Gadkaree et al. |
| 5,769,928 A | 6/1998 | Leavitt |
| 5,779,768 A | 7/1998 | Anand et al. |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,882,380 A | 3/1999 | Sircar |
| 5,906,673 A | 5/1999 | Reinhold, III et al. |
| 5,912,426 A | 6/1999 | Smolarek et al. |
| 5,914,294 A | 6/1999 | Park et al. |
| 5,924,307 A | 7/1999 | Nenov |
| 5,935,444 A | 8/1999 | Johnson et al. |
| 5,968,234 A | 10/1999 | Midgett, II et al. |
| 5,976,221 A | 11/1999 | Bowman et al. |
| 5,997,617 A | 12/1999 | Czabala et al. |
| 6,007,606 A | 12/1999 | Baksh et al. |
| 6,011,192 A | 1/2000 | Baker et al. |
| 6,023,942 A | 2/2000 | Thomas et al. |
| 6,053,966 A | 4/2000 | Moreau et al. |
| 6,063,161 A | 5/2000 | Keefer et al. |
| 6,096,115 A | 8/2000 | Kleinberg |
| 6,099,621 A | 8/2000 | Ho |
| 6,102,985 A | 8/2000 | Naheiri et al. |
| 6,129,780 A | 10/2000 | Millet et al. |
| 6,136,222 A | 10/2000 | Friesen et al. |
| 6,147,126 A | 11/2000 | DeGeorge et al. |
| 6,152,991 A | 11/2000 | Ackley |
| 6,156,101 A | 12/2000 | Naheiri |
| 6,171,371 B1 | 1/2001 | Derive et al. |
| 6,176,897 B1 | 1/2001 | Keefer |
| 6,179,900 B1 | 1/2001 | Behling et al. |
| 6,183,538 B1 | 2/2001 | Naheiri |
| 6,194,079 B1 | 2/2001 | Hekal |
| 6,210,466 B1 | 4/2001 | Whysall et al. |
| 6,231,302 B1 | 5/2001 | Bonardi |
| 6,245,127 B1 | 6/2001 | Kane et al. |
| 6,284,021 B1 | 9/2001 | Lu et al. |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,402,813 B2 | 6/2002 | Monereau et al. |
| 6,406,523 B1 | 6/2002 | Connor et al. |
| 6,425,938 B1 | 7/2002 | Xu et al. |
| 6,432,379 B1 | 8/2002 | Heung |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |
| 6,444,610 B1 | 9/2002 | Yamamoto |
| 6,451,095 B1 | 9/2002 | Keefer et al. |
| 6,457,485 B2 | 10/2002 | Hill et al. |
| 6,458,187 B1 | 10/2002 | Fritz et al. |

(56) References Cited

U.S. PATENT DOCUMENTS

| | | |
|---|---|---|
| 6,464,761 B1 | 10/2002 | Bugli |
| 6,471,749 B1 | 10/2002 | Kawai et al. |
| 6,471,939 B1 | 10/2002 | Boix et al. |
| 6,488,747 B1 | 12/2002 | Keefer |
| 6,497,750 B2 | 12/2002 | Butwell et al. |
| 6,500,234 B1 | 12/2002 | Ackley et al. |
| 6,500,241 B2 | 12/2002 | Reddy |
| 6,500,404 B1 | 12/2002 | Camblor Fernandez et al. |
| 6,503,299 B2 | 1/2003 | Baksh et al. |
| 6,506,351 B1 | 1/2003 | Jain et al. |
| 6,514,318 B2 | 2/2003 | Keefer |
| 6,514,319 B2 | 2/2003 | Keefer et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez-Suarez |
| 6,660,064 B2 | 12/2003 | Golden et al. |
| 6,660,065 B2 | 12/2003 | Byrd et al. |
| 6,692,626 B2 | 2/2004 | Keefer et al. |
| 6,712,087 B2 | 3/2004 | Hill et al. |
| 6,742,507 B2 | 6/2004 | Keefer et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,172,645 B1 | 2/2007 | Pfister et al. |
| 7,189,280 B2 | 3/2007 | Alizadeh-Khiavi et al. |
| 7,243,679 B2 | 7/2007 | Thelen |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,107 B2 | 10/2007 | Baksh et al. |
| 7,279,029 B2 | 10/2007 | Occhialini et al. |
| 7,285,350 B2 | 10/2007 | Keefer et al. |
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | LaBuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |
| 7,867,320 B2 | 1/2011 | Baksh et al. |
| 7,902,114 B2 | 3/2011 | Bowie et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | LaBuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,449,649 B2 | 5/2013 | Greenough |
| 8,470,395 B2 | 6/2013 | Khiavi et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |
| 8,529,664 B2 | 9/2013 | Deckman et al. |

(56) References Cited

U.S. PATENT DOCUMENTS

| | | |
|---|---|---|
| 8,529,665 B2 | 9/2013 | Manning et al. |
| 8,535,414 B2 | 9/2013 | Johnson et al. |
| 8,545,602 B2 | 10/2013 | Chance et al. |
| 8,551,444 B2 | 10/2013 | Agnihotri et al. |
| 8,573,124 B2 | 11/2013 | Havran et al. |
| 8,591,627 B2 | 11/2013 | Jain |
| 8,591,634 B2 | 11/2013 | Winchester et al. |
| 8,616,233 B2 | 12/2013 | McLean et al. |
| 8,657,922 B2 | 2/2014 | Yamawaki et al. |
| 8,673,059 B2 | 3/2014 | Leta et al. |
| 8,680,344 B2 | 3/2014 | Weston et al. |
| 8,715,617 B2 | 5/2014 | Genkin et al. |
| 8,752,390 B2 | 6/2014 | Wright et al. |
| 8,753,428 B2 | 6/2014 | Lomax, Jr. et al. |
| 8,778,051 B2 | 7/2014 | Weist, Jr. et al. |
| 8,784,533 B2 | 7/2014 | Leta et al. |
| 8,784,534 B2 | 7/2014 | Kamakoti et al. |
| 8,784,535 B2 | 7/2014 | Ravikovitch et al. |
| 8,790,618 B2 | 7/2014 | Adams et al. |
| 8,795,411 B2 | 8/2014 | Hufton et al. |
| 8,808,425 B2 | 8/2014 | Genkin et al. |
| 8,808,426 B2 | 8/2014 | Sundaram |
| 8,814,985 B2 | 8/2014 | Gerds et al. |
| 8,852,322 B2 | 10/2014 | Gupta et al. |
| 8,858,683 B2 | 10/2014 | Deckman |
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,939,014 B2 | 1/2015 | Kamakoti et al. |
| 9,005,561 B2 | 4/2015 | Leta |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 | 5/2015 | Deckman et al. |
| 9,050,553 B2 | 6/2015 | Alizadeh-Khiavi et al. |
| 9,067,168 B2 | 6/2015 | Frederick et al. |
| 9,067,169 B2 | 6/2015 | Patel |
| 9,095,809 B2 | 8/2015 | Deckman et al. |
| 9,108,145 B2 | 8/2015 | Kalbassi et al. |
| 9,120,049 B2 | 9/2015 | Sundaram et al. |
| 9,126,138 B2 | 9/2015 | Deckman et al. |
| 9,162,175 B2 | 10/2015 | Sundaram |
| 9,168,483 B2 | 10/2015 | Ravikovitch et al. |
| 9,168,485 B2 | 10/2015 | Deckman et al. |
| 9,272,264 B2 | 3/2016 | Coupland |
| 9,278,338 B2 | 3/2016 | Coupland |
| 9,358,493 B2 | 6/2016 | Tammera et al. |
| 9,573,116 B2 | 2/2017 | Johnson et al. |
| 9,597,655 B2 | 3/2017 | Beeckman |
| 9,737,846 B2 | 8/2017 | Carstensen et al. |
| 9,744,521 B2 | 8/2017 | Brody et al. |
| 10,040,022 B2 | 8/2018 | Fowler et al. |
| 10,080,991 B2 | 9/2018 | Johnson et al. |
| 10,080,992 B2 | 9/2018 | Nagavarapu et al. |
| 10,124,286 B2 | 11/2018 | McMahon et al. |
| 2001/0047824 A1 | 12/2001 | Hill et al. |
| 2002/0053547 A1 | 5/2002 | Schlegel et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0145726 A1 | 8/2003 | Gueret et al. |
| 2003/0170527 A1 | 9/2003 | Finn et al. |
| 2003/0188635 A1 | 10/2003 | Lomax, Jr. et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0118277 A1 | 6/2004 | Kim |
| 2004/0118747 A1 | 6/2004 | Cutler et al. |
| 2004/0197596 A1 | 10/2004 | Connor et al. |
| 2004/0232622 A1 | 11/2004 | Gozdawa |
| 2005/0014511 A1 | 1/2005 | Spain |
| 2005/0045041 A1 | 3/2005 | Hechinger et al. |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0017940 A1 | 1/2006 | Takayama |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0099096 A1 | 5/2006 | Shaffer et al. |
| 2006/0105158 A1 | 5/2006 | Fritz et al. |
| 2006/0116430 A1 | 6/2006 | Wentink et al. |
| 2006/0116460 A1 | 6/2006 | Georget et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0202336 A1 | 8/2008 | Hofer et al. |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance |
| 2008/0282892 A1 | 11/2008 | Deckman et al. |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0025555 A1 | 1/2009 | Lively et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0294366 A1 | 12/2009 | Wright et al. |
| 2009/0308248 A1 | 12/2009 | Siskin et al. |
| 2009/0314159 A1 | 12/2009 | Haggerty |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0186445 A1 | 7/2010 | Minta et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0011803 A1 | 1/2011 | Koros |
| 2011/0020202 A1 | 1/2011 | Gadkaree et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0123878 A1 | 5/2011 | Jangbarwala |
| 2011/0146494 A1 | 6/2011 | Desai et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024150 A1 | 2/2012 | Moniot |
| 2012/0024152 A1 | 2/2012 | Yamawaki et al. |

(56) References Cited

U.S. PATENT DOCUMENTS

| | | | |
|---|---|---|---|
| 2012/0031144 | A1 | 2/2012 | Northrop et al. |
| 2012/0067216 | A1 | 3/2012 | Corma-Canos et al. |
| 2012/0152115 | A1 | 6/2012 | Gerds et al. |
| 2012/0222551 | A1 | 9/2012 | Deckman |
| 2012/0222552 | A1 | 9/2012 | Ravikovitch et al. |
| 2012/0222553 | A1 | 9/2012 | Kamakoti et al. |
| 2012/0222554 | A1 | 9/2012 | Leta et al. |
| 2012/0222555 | A1 | 9/2012 | Gupta et al. |
| 2012/0255377 | A1 | 10/2012 | Kamakoti et al. |
| 2012/0272823 | A1 | 11/2012 | Halder et al. |
| 2012/0308456 | A1 | 12/2012 | Leta et al. |
| 2012/0312163 | A1 | 12/2012 | Leta et al. |
| 2013/0061755 | A1 | 3/2013 | Frederick et al. |
| 2013/0095996 | A1 | 4/2013 | Buelow et al. |
| 2013/0225898 | A1 | 8/2013 | Sundaram et al. |
| 2014/0013955 | A1 | 1/2014 | Tammera et al. |
| 2014/0060326 | A1 | 3/2014 | Sundaram et al. |
| 2014/0157984 | A1 | 6/2014 | Deckman et al. |
| 2014/0157986 | A1 | 6/2014 | Ravikovitch et al. |
| 2014/0208797 | A1 | 7/2014 | Kelley et al. |
| 2014/0216254 | A1 | 8/2014 | Tammera et al. |
| 2015/0013377 | A1 | 1/2015 | Oelfke |
| 2015/0068397 | A1 | 3/2015 | Boulet et al. |
| 2015/0101483 | A1 | 4/2015 | Perry et al. |
| 2015/0196870 | A1 | 7/2015 | Albright et al. |
| 2015/0328578 | A1 | 11/2015 | Deckman et al. |
| 2016/0023155 | A1 | 1/2016 | Ramkumar et al. |
| 2016/0129433 | A1 | 5/2016 | Tammera et al. |
| 2016/0166972 | A1 | 6/2016 | Owens et al. |
| 2016/0236135 | A1 | 8/2016 | Tammera et al. |
| 2016/0332105 | A1 | 11/2016 | Tammera et al. |
| 2016/0332106 | A1 | 11/2016 | Tammera et al. |
| 2017/0056814 | A1 | 3/2017 | Marshall et al. |
| 2017/0113173 | A1 | 4/2017 | Fowler et al. |
| 2017/0113175 | A1 | 4/2017 | Fowler et al. |
| 2017/0136405 | A1 | 5/2017 | Ravikovitch et al. |
| 2017/0266604 | A1 | 9/2017 | Tammera et al. |
| 2017/0282114 | A1 | 10/2017 | Owens et al. |
| 2017/0341011 | A1 | 11/2017 | Nagavarapu et al. |
| 2017/0341012 | A1 | 11/2017 | Nagavarapu et al. |
| 2018/0001301 | A1 | 1/2018 | Brody et al. |
| 2018/0056229 | A1 | 3/2018 | Denton et al. |
| 2018/0056235 | A1 | 3/2018 | Wang et al. |
| 2018/0126299 | A1* | 5/2018 | Doong ................. B01D 15/161 |
| 2018/0169565 | A1 | 6/2018 | Brody et al. |
| 2018/0169617 | A1 | 6/2018 | Brody et al. |
| 2018/0339263 | A1 | 11/2018 | Dehaas et al. |
| 2019/0217244 | A1* | 7/2019 | Fisel ................. B01D 53/0462 |

FOREIGN PATENT DOCUMENTS

| | | |
|---|---|---|
| EP | 0904827 | 3/1999 |
| EP | 1674555 | 6/2006 |
| EP | 2823872 | 1/2015 |
| FR | 2854819 | 5/2003 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 06006736 | 6/1992 |
| JP | 3477280 | 8/1995 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| KR | 101349424 | 1/2014 |
| WO | WO2002/024309 | 3/2002 |
| WO | WO2002/073728 | 9/2002 |
| WO | WO2005/090793 | 9/2005 |
| WO | WO2010/024643 | 3/2010 |
| WO | WO2011/139894 | 11/2011 |

OTHER PUBLICATIONS

U.S. Appl. No. 16/258,266, filed Jan. 25, 2019, Barnes et al.
U.S. Appl. No. 16/263,940, filed Jan. 31, 2019, Johnson.
U.S. Appl. No. 62/783,766, filed Dec. 21, 2019, Fulton et al.
Allen, M. P. et al., (1987) "Computer Simulation of Liquids" Clarendon Press, pp. 156-160.
Asgari, M. et al., (2014) "Designing A Commercial Scale Pressure Swing Adsorber For Hydrogen Purification" *Petroleum & Coal*, vol. 56(5), pp. 552-561.
Baerlocher, C. et al., (2017) International Zeolite Association's "Database of Zeolite Structures," available at http://www.iza-structure.org/databases/, downloaded Jun. 15, 2018, 1 page.
Burtch, N.C. et al., (2015) "Molecular-level Insight into Unusual Low Pressure CO2 Affinity in Pillared Metal-Organic Frameworks," *J Am Chem Soc*, 135, pp. 7172-7180.
Beauvais, C. et al., (2004) "Distribution of Sodium Cations in Faujasite-Type Zeolite: A Canonical Parallel Tempering Simulation Study," *J Phys Chem B*, 108, pp. 399-404.
Cheung, O. et al., (2013) "Adsorption kinetics for CO2 on highly selective zeolites NaKA and nano-NaKA," *Appl Energ*, 112, pp. 1326-1336.
Cygan, R. T. et al., (2004) "Molecular Models of Hydroxide, Oxyhydroxide, and Clay Phases and the Development of a General Force Field", *J Phys Chem B*, vol. 108, pp. 1255-1266.
Deem, M. W. et al., (2009) "Computational Discovery of New Zeolite-Like Materials", *J Phys Chem C*, 113, pp. 21353-21360.
Demiralp, E., et al., (1999) "Morse Stretch Potential Charge Equilibrium Force Field for Ceramics: Application to the Quartz-Stishovite Phase Transition and to Silica Glass", *Physical Review Letters*, vol. 82(8), pp. 1708-1711.
Dubbeldam, D. et al. (2016) "RASPA: molecular simulation software for adsorption and diffusion in flexible nanoporous materials" *Molecular Simulation*, (published online Feb. 26, 2015), vol. 42(2), pp. 81-101.
Dubbeldam, D., et al., (2013) "On the inner workings of Monte Carlo codes" *Molecular Simulation*, vol. 39, Nos. 14-15, pp. 1253-1292.
Earl, D. J. et al., (2005) "Parallel tempering: Theory, applications, and new perspectives," *Phys Chem Chem Phys*, vol. 7, pp. 3910-3916.
ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.
Fang, H. et al., (2013) "First principles derived, transferable force fields for CO2 adsorption in Na-exchanged cationic zeolites," Phys Chem Chem Phys, vol. 15, pp. 12882-12894.
Fang, H., et al., (2012) "Prediction of CO2 Adsorption Properties in Zeolites Using Force Fields Derived from Periodic Dispersion-Corrected DFT Calculations," J Phys Chem C, 10692, 116, ACS Publications.
Farooq, S. et al. (1990) "Continuous Countercurrent Flow Model for a Bulk PSA Separation Process," *AIChE J.*, v36 (2) p. 310-314.
FlowServe (2005) "Exceeding Expectations, US Navy Cuts Maintenance Costs With Flowserve GX-200 Non-Contacting Seal Retrofits," *Face-to-Face*, v17.1, 8 pgs.
Foster, M.D., et al. "A geometric solution to the largest-free-sphere problem in zeolite frameworks", *Microporous and Mesoporous Materials*, vol. 90, pp. 32-38.
Frenkel, D. et al., (2002) "Understanding Molecular Simulation: From Algorithms to Applications", 2nd ed., *Academic Press*, pp. 292-301.
Garcia, E. J., et al. (2014) "Tuning the Adsorption Properties of Zeolites as Adsorbents for CO2 Separation: Best Compromise between the Working Capacity and Selectivity", *Ind. Eng. Chem. Res.*, vol. 53, pp. 9860-9874.
GE Oil & Gas (2007) "Dry Gas Seal Retrofit," Florene, Italy, www.ge.com/oilandgas, 4 pgs.

(56) References Cited

OTHER PUBLICATIONS

Harris, J. G. et al., (1995) "Carbon Dioxide's Liquid—Vapor Coexistence Curve and Critical Properties as Predicted by a Simple Molecular Model", *J Phys Chem*, vol. 99, pp. 12021-12024.

Hill, J. R. et al., (1995) "Molecular Mechanics Potential for Silica and Zeolite Catalysts Based on ab Initio Calculations. 2. Aluminosilicates", *J Phys Chem*, vol. 99, pp. 9536-9550.

Hopper, B. et al. (2008) "World's First 10,000 psi Sour Gas Injection Compressor," *Proceedings of the 37th Turbomachinery Symposium*, pp. 73-95.

Jain, S., et al. (2003) "Heuristic design of pressure swing adsorption: a preliminary study", *Separation and Purification Technology*, vol. 33, pp. 25-43.

Kim J. et al. (2012) "Predicting Large CO2 Adsorption in Aluminosilicate Zeolites for Postcombustion Carbon Dioxide Capture", J. Am. Chem, Soc., vol. 134, pp. 18940-18940.

Kärger, J., et al.(2012) "Diffusion in Nanoporous Materials", Whiley-VCH publisher, vol. 1, Chapter 16, pp. 483-501.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Lin, L., et al. (2012) "In silico screening of carbon-capture materials", *Nature Materials*, vol. 1, pp. 633-641.

Liu, Q. et al., (2010) "NaKA sorbents with high $CO_2$-over-$N_2$ selectivity and high capacity to adsorb $CO_2$," *Chem Commun*, , vol. 46, pp. 4502-4504.

Lowenstein, W., (1954) "The Distribution of Aluminum in the Tetra-Hedra of Silicates and Aluminates" Am Mineral, 92-96.

Neimark, A. V. et al., (1997) "Calibration of Pore Volume in Adsorption Experiments and Theoretical Models", *Langmuir*, vol. 13, pp. 5148-5160.

Palomino, M., et al. (2009) "New Insights on CO2-Methane Seapration Using LTA Zeolites with Different Si/Al Ratios and a First Comparison with MOFs", Langmar, vol. 26(3), pp. 1910-1917.

Patcas, F.C. et al.(2007) "CO Oxidation Over Structured Carriers: A Comparison of Ceramic Forms, Honeycombs and Beads", *Chem Engineering Science*, v. 62, pp. 3984-3990.

Peng, D. Y., et al., (1976) "A New Two-Constant Equation of State", *Ind Eng Chem Fundam*, vol. 15, pp. 59-64.

Pham, T. D. et al., (2013) "Carbon Dioxide and Nitrogen Adsorption on Cation-Exchanged SSZ-13 Zeolites", *Langmuir*, vol. 29, pp. 832-839.

Pophale, R., et al., (2011) "A database of new zeolite-like materials", *Phys Chem Chem Phys*, vol. 13(27), pp. 12407-12412.

Potoff, J. J. et al., (2001) "Vapor-Liquid Equilibria of Mixtures Containing Alkanes, Carbon Dioxide, and Nitrogen", AIChE 2, vol. 47(7), pp. 1676-1682.

Rameshni, Mahin "Strategies for Sour Gas Field Developments," *Worley Parsons-Brochure*, 20 pp.

Reyes, S. C. et al. (1997) "Frequency Modulation Methods for Diffusion and Adsorption Measurements in Porous Solids," *J. Phys. Chem. B*. v101, pp. 614-622.

Rezaei, F. et al. (2009) "Optimum Structured Adsorbents for Gas Separation Process", *Chem. Engineering Science*, v. 64, pp. 5182-5191.

Richardson, J.T. et al. (2000) "Properties of Ceramic Foam Catalyst Supports: Pressure Dop", *Applied Catalysis A: General* v. 204, pp. 19-32.

Robinson, D. B., et al., (1985) "The development of the Peng—Robinson Equation and its Application to Phase Equilibrium in a System Containing Methanol," *Fluid Phase Equilibria*, vol. 24, pp. 25-41.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Reliability in Centrifugal Compressors," *Dresser-Rand, Tech. Paper* 134, 15 pages.

Santos, M. S (2011) "New Cycle configuration to enhance performance of kinetic PSA processes" Chemical Engineering Science 66, pp. 1590-1599.

Snurr, R. Q. et al., (1993) "Prediction of Adsorption of Aromatic Hydrocarbons in Silicalite from Grand Canonical Monte Carlo Simulations with Biased Insertions", *J Phys Chem*, vol. 97, pp. 13742-13752.

Stemmet, C.P. et al. (2006) "Solid Foam Packings for Multiphase Reactors: Modelling of Liquid Holdup and Mass Transfer", *Chem. Engineering Research and Design*, v. 84(A12), pp. 1134-1141.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

Talu, O. et al., (2001), "Reference potentials for adsorption of helium, argon, methane, and krypton in high-silica zeolites," *Colloids and Surfaces A: Physicochemical and Engineering Aspects*, vol. 83-93, pp. 83-93.

Walton, K. S. et al., (2006) "CO2 adsorption in Y and X zeolites modified by alkali metal cation exchange," *Microporous and Mesoporous Mat*, vol. 91, pp. 78-84.

Willems, T. F. et al., (2012) "Algorithms and tools for high-throughput geometry-based analysis of crystalline porous materials" *Microporous Mesoporous Mat*, vol. 149, pp. 134-141.

Zukal, A., et al., (2009) "Isosteric heats of adsorption of carbon dioxide on zeolite MCM-22 modified by alkali metal cations", *Adsorption*, vol. 15, pp. 264-270.

\* cited by examiner

APPARATUS AND SYSTEM FOR SWING ADSORPTION PROCESSES

CROSS-REFERENCE TO RELATED APPLICATION

This is a divisional of U.S. patent application Ser. No. 15/496,576, filed Apr. 25, 2017, which claims the benefit of U.S. Provisional Patent Application No. 62/343,426, filed May 31, 2016, entitled APPARATUS AND SYSTEM FOR SWING ADSORPTION PROCESSES, the entirety of which is incorporated by reference herein.

FIELD

The present techniques relate to a method and system associated with swing adsorption processes used in conditioning streams for downstream processing. In particular, the method and system involve a startup mode process for a swing adsorption process, which is further utilized for starting downstream process.

BACKGROUND

Gas separation is useful in many industries and can typically be accomplished by flowing a mixture of gases over an adsorbent material that preferentially adsorbs one or more gas components while not adsorbing one or more other gas components. The non-adsorbed components are recovered as a separate product.

One particular type of gas separation technology is swing adsorption, such as temperature swing adsorption (TSA), pressure swing adsorption (PSA), partial pressure swing adsorption (PPSA), rapid cycle temperature swing adsorption (RCTSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and/or TSA) may be used to separate gases of a gas mixture because different gases tend to fill the micropore of the adsorbent material to different extents. For example, if a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated by reducing the pressure, thereby releasing the adsorbed carbon dioxide. Then, the adsorbent material is typically purged and repressurized prior to starting another adsorption cycle.

The swing adsorption processes typically involve adsorbent bed units, which include adsorbent beds disposed within a housing and configured to maintain fluids at various pressures for different steps in a cycle within the unit. These adsorbent bed units utilize different packing material in the bed structures. For example, the adsorbent bed units utilize checker brick, pebble beds or other available packing. As an enhancement, some adsorbent bed units may utilize engineered packing within the bed structure. The engineered packing may include a material provided in a specific configuration, such as a honeycomb, ceramic forms or the like.

Further, various adsorbent bed units may be coupled together with conduits and valves to manage the flow of fluids through the cycle. Orchestrating these adsorbent bed units involves coordinating the steps in the cycle for each of the adsorbent bed units with other adsorbent bed units in the system. A complete cycle can vary from seconds to minutes as it transfers a plurality of gaseous streams through one or more of the adsorbent bed units.

As may be appreciated, the removal of contaminants may result in the process operating in different modes, such as a startup mode and a normal operation mode. The startup mode may be utilized to prepare the equipment (e.g., the adsorbent bed and various stream) for the normal operation mode. The normal operation mode may be utilized when the process is receiving various streams, such as the gaseous feed stream, and removing contaminants from the gaseous feed stream to provide a product stream, which may be referred to as steady state. For example, the conventional processes may operate in normal operation mode to treat hydrocarbon containing streams containing water ($H_2O$) or carbon dioxide ($CO_2$) to prepare the stream for downstream processing, such as natural gas liquid recovery (NGL) or liquefied natural gas (LNG) processing. The normal operation modes may be different for each of the respective downstream processes based on the respective specifications that are involved for normal operational mode. For example, a typical LNG specification requires the $CO_2$ content to be less than 50 parts per million molar (ppm).

During the startup mode, the cycle may be different than the cycle utilized for normal operation mode. Conventional systems may utilize a single heating step to regenerate the adsorbent material with high temperatures to remove any contaminants as the startup mode cycle. For example, a startup process involving a mole sieve unit may include heating the bed to temperatures in excess of 550° F.

Unfortunately, conventional startup mode processes have certain limitations. For example, the process in startup mode may involve merely heating the adsorbent material to high temperatures. The heating of the adsorbent material to high temperatures in the conventional approaches typically rely upon dedicated high-temperature startup heaters. These heaters are expensive, involve large capital expenditure and high operational costs. In addition, these heaters increase the weight and footprint of the facility. Further, the cycle time is typically longer than necessary to remove contaminants to ensure sufficient time is provided for downstream equipment to begin operations. In addition, the temperature that the adsorbent material are exposed to may lessen the operational life of the adsorbent material and may lessen the efficiency of the adsorbent material.

Accordingly, there remains a need in the industry for apparatus, methods, and systems that provided enhancements to the start-up processes associated with hydrocarbon recovery processes. In particular, a need exists for enhancements to startup mode processes for rapid cycle swing adsorption processes.

SUMMARY OF THE INVENTION

In one or more embodiments, the present techniques comprise a process for removing contaminants from a gaseous feed stream with a swing adsorption process. The process comprising: a) performing a purge step, wherein the purge step comprises passing an external gas stream through an adsorbent bed unit to remove one or more contaminants from an adsorbent bed within a housing of the adsorbent bed unit to form a purge product stream; b) performing one or more adsorption steps, wherein each of the one or more adsorption steps comprise passing a gaseous feed stream through an adsorbent bed unit having an adsorbent bed to separate one or more contaminants from the gaseous feed stream to form a product stream; c) determining whether the product stream is within a specification for a contaminant; d) if the product stream is within the specification, passing the product stream to a downstream process; and e) if the product stream is not within the specification, repeating the steps a) to d) for at least one additional cycle.

In yet another embodiment, a cyclical swing adsorption system is described. The system includes a plurality of manifolds; a plurality of adsorbent bed units coupled to the plurality of manifolds, and an external gas bypass valve in fluid communication with purge manifold and configured to provide a flow passage for an external gas stream from an external gas storage vessel to the purge manifold in a startup mode position and configured to block the flow passage of the external gas stream from the external gas storage vessel to the purge manifold in a normal operation mode position. The plurality of manifolds comprise a feed manifold configured to pass a feed stream to the plurality of adsorbent bed units during an adsorption step, a product manifold configured to pass a product stream from the plurality of adsorbent bed units during the adsorption step, a purge manifold configured to pass a purge stream to the plurality of adsorbent bed units during a regeneration step, a purge product manifold configured to pass a purge product stream from the plurality of adsorbent bed units during the regeneration step. Each manifold of the plurality of manifolds is associated with one swing adsorption process step of a plurality of swing adsorption process steps. Each of the adsorbent bed units comprises a housing; an adsorbent material disposed within the housing; a plurality of valves, wherein at least one of the plurality of valves is associated with one of the plurality of manifolds and is configured to manage fluid flow along a flow path extending between the respective manifold and the adsorbent material.

In certain embodiments, the system or method may include certain variations. The plurality of valves may comprise one or more poppet valves; the plurality of manifolds and/or the plurality of adsorbent bed units may be configured to operate at pressures between 0.1 bar absolute (bara) and 100 bara; the system may include a heating unit disposed upstream of the purge manifold and downstream of the external gas storage vessel, wherein the heating unit may be configured to heat the external gas stream to a temperature in the range between a temperature in the range between 450° F. and the gaseous feed stream temperature or in the range between a temperature in the range between 450° F. and greater than 100° F. of the gaseous feed stream temperature; the system may include a conditioning unit disposed downstream of the purge product manifold and upstream of the external gas storage vessel, wherein the conditioning unit may be configured to remove one or more contaminants from the purge product stream; wherein the plurality of manifolds further comprise a blowdown manifold configured to pass a blowdown stream from the plurality of adsorbent bed units during a blowdown step; and the system may include a liquefied natural gas process unit in fluid communication with the adsorbent bed unit and configured to receive the product stream and separate the product stream into a final product stream and a flash fuel stream, wherein the flash fuel stream may be passed to the purge manifold. Further, the external gas stream may comprise a nitrogen stream comprising predominately nitrogen with less than 0.1 ppm of water, less than 1 ppm of water or less than 10 ppm of water or at least one of nitrogen, methane, helium, hydrogen or any combination thereof.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Figure 1:
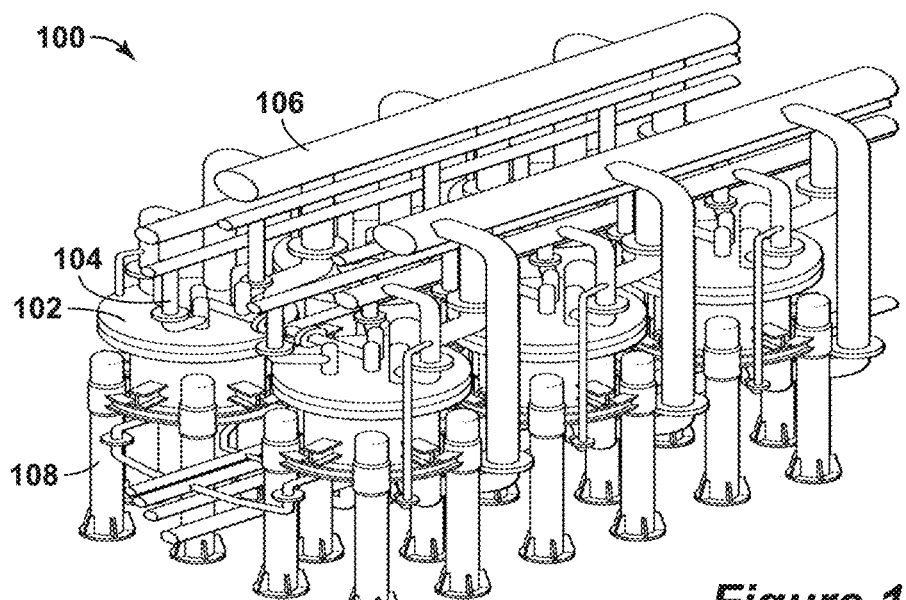
FIG. 1 is a three-dimensional diagram of the swing adsorption system with six adsorbent bed units and interconnecting piping in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, "conduit" refers to a tubular member forming a channel through which something is conveyed. The conduit may include one or more of a pipe, a manifold, a tube or the like.

The provided processes, apparatus, and systems of the present techniques may be used in swing adsorption processes that remove contaminants ($CO_2$, $H_2O$, and $H_2S$) from feed streams, such as hydrocarbon containing streams. As may be appreciated and as noted above, the hydrocarbon containing feed streams may have different compositions. For example, the gaseous feed stream may be a hydrocarbon containing stream having greater than one volume percent hydrocarbons based on the total volume of the feed stream. As another example, the hydrocarbon feed streams may vary widely in amount of acid gas, such as from several parts per million acid gas to 90 volume percent (vol. %) acid gas. Non-limiting examples of acid gas concentrations from exemplary gas reserves sources include concentrations of approximately: (a) 4 ppm $H_2S$, 2 vol. % $CO_2$, 100 ppm $H_2O$ (b) 4 ppm $H_2S$, 0.5 vol. % $CO_2$, 200 ppm $H_2O$ (c) 1 vol. % $H_2S$, 2 vol. % $CO_2$, 150 ppm $H_2O$, (d) 4 ppm $H_2S$, 2 vol. % $CO_2$, 500 ppm $H_2O$, and (e) 1 vol. % $H_2S$, 5 vol. % $CO_2$, 500 ppm $H_2O$. Further, in certain applications the hydrocarbon containing stream may include predominately hydrocarbons with specific amounts of $CO_2$ and/or water. For example, the hydrocarbon containing stream may have greater than 0.00005 volume percent $CO_2$ based on the total volume of the gaseous feed stream and less than 2 volume percent $CO_2$ based on the total volume of the gaseous feed stream; or less than 10 volume percent $CO_2$ based on the total volume of the gaseous feed stream. The processing of feed streams may be more problematic when certain specifications have to be satisfied.

The removal of contaminants may be performed by swing adsorption processes during normal operations to prepare the stream for further downstream processing, such as NGL processing and/or LNG processing. For example, natural gas feed streams for liquefied natural gas (LNG) applications have stringent specifications on the $CO_2$ content to ensure against formation of solid $CO_2$ at cryogenic temperatures. The LNG specifications may involve the $CO_2$ content to be less than or equal to 50 ppm. Such specifications are not applied on natural gas streams in pipeline networks, which may involve the $CO_2$ content up to 2 vol. % based on the total volume of the gaseous feed stream. As such, for LNG facilities that use the pipeline gas (e.g., natural gas) as the raw feed, additional treating or processing steps are utilized to further purify the stream. Further, the present techniques may be used to lower the water content of the stream to less than 0.1 ppm. Exemplary swing adsorption processes and configurations may include U.S. Patent Ser. Nos. 62/213,262; 62/213,267; 62/213,270; 62/213,273; 62/246,916; 62/246,920; and 62/246,922, which are each incorporated by reference herein.

The present techniques provide configurations and processes that are utilized to enhance the startup mode for the swing adsorption process and associated downstream processes. While the normal operation mode processes are described based on steady state operation, startup mode procedures involve different cycles until normal operation mode is begun. The present techniques describes different methods that may be utilized to transition the operation from startup mode to normal operation mode. In startup mode, each of the adsorbent beds utilized in the swing adsorption process is assumed to be in equilibrium with contaminants. For dehydration applications, the contaminant is water ($H_2O$), while for carbon dioxide ($CO_2$) applications, the contaminant is either $H_2O$ (e.g., in equilibrium with atmosphere) or $CO_2$ (e.g., in case of a shutdown). Accordingly, the startup mode is utilized to remove contaminants to prepare the adsorbent beds for normal operation mode. In particular, the startup mode sequence may be used for swing adsorption processes (e.g., dehydration and low-level $CO_2$ removal) upstream or integrated with NGL and LNG applications.

The startup mode process may involve the use of an external medium to remove one or more contaminants from the adsorbent beds. In the external startup mode, an external medium is used to remove one or more contaminants from the adsorbent beds. The external medium may include the use of an external gas stream that is circulated through the adsorbent beds to remove the one or more contaminants from the adsorbent beds during a regeneration step (e.g., a purge step). The external gas stream may include nitrogen, dry methane or other non-reactive stream under process operating conditions. For example, the external stream may include predominately nitrogen or methane with less than 0.1 ppm of water, less than 1 ppm of water or less than 10 ppm of water. The external gas stream may comprise at least one of nitrogen, methane, helium, hydrogen or any combination thereof.

For example, in dehydration applications, an external gas stream, such as dry nitrogen (e.g., nitrogen stream having less than 0.1 ppm of water, less than 1 ppm of water or less than 10 ppm of water), may be used to remove water from the adsorbent beds during the startup mode. When the dry nitrogen stream is introduced into each of the adsorbent beds, which is at equilibrium with ambient water, some of the water transfers from the adsorbent material in the adsorbent bed to the dry nitrogen stream. The startup mode sequence may involve providing feed to the adsorbent bed during an adsorption step and using the external stream to purge the adsorbent bed during a purge step. The startup mode cycle may continue to use the dry nitrogen until a sufficient amount of water is removed from each of the adsorbent beds and a desired bed profile is achieved for the adsorbent beds. Then, the resulting product stream from the adsorbent beds is within the desired specification (e.g., below the specific contaminant levels for the product stream). In addition, the startup mode may include maintaining the purge step with dry nitrogen to sufficient amounts of moisture, and then start the sequence described above. In such a configuration, the product stream may be within specification from the first cycle.

Once the product stream is within the desired specification, the product stream may be used in the startup mode process for the downstream processes, such as a demethanizer or a liquefaction train. As the downstream processes and units are being started, the adsorbent beds continue to regenerate using the external gas stream, such as the dry nitrogen stream. Alternatively, a heated slip stream from the product side may also be used to regenerate the spent adsorbent beds. As the downstream process begins producing a purge stream, this purge stream may be combined with the external gas stream and the amount of external gas stream utilized in the purge step may be adjusted. Once the downstream processes begin normal operations, the desired purge stream (e.g., within the desired specifications), such as a residue gas stream or fuel gas stream, is provided to the adsorbent bed as part of the normal operation mode. At this point, the adsorbent bed regeneration stream is transitioned from nitrogen to the purge stream from the downstream process.

To facilitate rapid regeneration and minimize the amount of dry nitrogen being utilized during the external startup mode, the operating conditions may be adjusted to manage the removal of contaminants from the adsorbent bed. For example, the flow rate for the gaseous feed stream may be conducted within a flow rate range below the normal operation mode flow ranges (e.g., flow rate at turndown). For example, the flow rates in startup mode may be at about 25% of the normal operation mode flow rate, at about 50% of the normal operation mode flow rate, at about 75% of the normal operation mode flow rate, in a range between 25% and 90% of the normal operation flow rate, in a range between 50% and 90% of the normal operation flow rate, and in a range between 75% and 90% of the normal operation flow rate. Further, the regeneration of the adsorbent bed may be conducted within a pressure range near atmospheric pressure (e.g., in a pressure range between atmospheric pressure and fifty pounds per square inch gauge (psi) above atmospheric pressure) or may be within a pressure range near normal operation mode pressures (e.g., in a pressure range between 75% of normal operation mode pressure and 125% of normal operation mode pressure or at a pressure between atmospheric pressure and normal operating pressure or a pressure close to feed pressure). As an example, the regeneration of the adsorbent bed may be conducted in a pressure range from 300 pounds per square inch gauge (psi) to 650 psi. Also, the temperature of the external medium stream may be provided within a temperature range from (e.g., in a temperature range between 20° Celsius (C) above atmospheric temperature and 150° Celsius (C) above atmospheric temperature). Also, the temperature of the external stream may be in a range between 350° F. and 550° F., in a range between 350° F. and 550° F. or in a range 450° F. and 550° F. in a range between 100° F. and 550° F., in a range between 150° F. and 450° F. or in a range 250° F. and 350° F.

For a dehydration application, the sequence of the cycle for the startup mode may be configured to lessen flaring of gas or completely eliminate flaring of gas. The external sequence may be initiated at turndown. The purge pressure is selected such that the purge product is at the suction pressure of the residue gas compressor. The residue gas compressor is then operated to compress the purge product and recombine with the feed stream either upstream or downstream of a triethylene glycol (TEG) based dehydration unit. Knockout drums may be necessary to remove the excess water gathered from the purge step.

As a specific example, the startup mode process may be used for a cryogenic NGL recovery facility. The external startup process may include passing wet gas to the absorbent units at turndown. Then, the external startup process is utilized to clean the adsorbent beds. The process is continued until product stream is at specification and the desired water profile in the adsorbent bed is achieved. Next, the flow rate of the gas stream entering the adsorbent beds is increased for subsequent cycles. Then, at least a portion of the dry product stream is introduced to the cryogenic NGL recovery facility. As necessary, the purge inlet temperature may be adjusted to achieve the necessary purge to remove the water in the adsorbent beds. With the product stream from the adsorbent beds, the startup sequence for the cryogenic NGL recovery facility is initiated. This cryogenic NGL facility may perform the startup mode using the residue gas compressor to recycle the demethanizer column overhead product with the external stream. Once the NGL recovery facility is approaching specification, a portion of the demethanizer overhead product is mixed with the purge stream from the adsorbent beds in swing adsorption process to increase the flow rate. The heat from the startup heater may be reduced as necessary. Eventually, the overhead product stream from the demethanizer is introduced to the adsorbent beds as a purge stream for the respective cycles and the portion of the external stream from the adsorbent bed being used as the purge stream is lessened and may be eliminated. The process eventually transitions to normal operation mode, which is a steady state with the adsorbent beds purge product gas being provided for sale.

Similarly, the above sequence may be used for the LNG process. However, a source of gas to compress the purge product to feed pressure may not be available with the LNG process during startup mode. As such, some of the purge stream may have to be flared. For the $CO_2$ removal processes, a similar external startup mode sequence may be used. Additionally, a loop heating step may be used to provide the necessary heat to the adsorbent beds.

One or more variants to the procedure noted above may be used to reduce the startup time of the process. The first variant includes heating adsorbent beds to reduce the amount of water in the adsorbent beds, which may be performed initially. In the heating step, the heated stream at low pressure is used as the purge stream for the absorbent beds and removes a large amount of water already adsorbed in the adsorbent beds. A second variant involves performing one or more blowdown steps in the startup mode process to flare or rapidly decrease the partial pressure and reduce the amount of water adsorbed in the adsorbent beds. A third variant involves performing a purge step with dry nitrogen, which may be heated, if necessary, to dry the adsorbent beds.

The present techniques provide a startup mode process that may be utilized to initiate the normal operation mode process for a swing adsorption process, and specifically a rapid cycle adsorption process. The present techniques may include some additional equipment, such as one or more conduits and/or one or more manifolds that provide a fluid path for the external gas stream, an external gas storage tank, a heating unit (furnace and/or heat exchanger), one or more blowers and/or one or more compressors to fluidly communication with one or more adsorbent beds, and/or depressurizing equipment that may be utilized to facilitate the startup mode cycle. In addition, other components and configurations may be utilized to provide the swing adsorption process, such as rapid cycle enabling hardware components (e.g., parallel channel adsorbent bed designs, rapid actuating valves, adsorbent bed configurations that integrate with other processes). Exemplary swing adsorption processes and configurations may also include U.S. Patent Ser. Nos. 62/213,262; 62/213,267; 62/213,270; 62/213,273; 62/246,916; 62/246,920; and 62/246,922, which are each incorporated by reference herein.

In one or more embodiment, a startup mode process for a swing adsorption process may include using an external startup mode. For the external startup mode, the present techniques comprise a process for removing contaminants from a gaseous feed stream with a swing adsorption process, which may be utilized with one or more downstream processes. The process comprising: a) performing a regeneration step (e.g., purge step), wherein the step comprises passing an external gas stream through an adsorbent bed unit to remove contaminants from an adsorbent bed within a housing of the adsorbent bed unit to form a purge product stream; b) performing one or more adsorption steps, wherein each of the one or more adsorption steps comprise passing a gaseous feed stream through an adsorbent bed unit having an adsorbent bed to separate contaminants from the gaseous feed stream to form a product stream; c) determining whether the product stream is within a specification for at least one contaminant; d) if the product stream is within the specification (e.g., is below a certain threshold), passing the product stream to a downstream process; and e) if the product stream is not within the specification (e.g., above a certain threshold), repeating the steps a) to d) for at least one additional cycle.

As another example for the external startup mode, a cyclical swing adsorption system may include a plurality of manifolds; a plurality of adsorbent bed units coupled to the plurality of manifolds, and an external gas bypass valve in fluid communication with purge manifold and configured to provide a flow passage for an external gas stream from an external gas storage vessel to the purge manifold in a startup mode position and configured to block the flow passage of the external gas stream from the external gas storage vessel to the purge manifold in a normal operation mode position. The plurality of manifolds comprise a feed manifold configured to pass a feed stream to the plurality of adsorbent bed units during an adsorption step, a product manifold configured to pass a product stream from the plurality of adsorbent bed units during the adsorption step, a purge manifold configured to pass a purge stream to the plurality of adsorbent bed units during a regeneration step, a purge product manifold configured to pass a purge product stream from the plurality of adsorbent bed units during the regeneration step. Each manifold of the plurality of manifolds is associated with one swing adsorption process step of a plurality of swing adsorption process steps. Each of the adsorbent bed units comprising a housing; an adsorbent material disposed within the housing; a plurality of valves, wherein at least one of the plurality of valves is associated with one of the plurality of manifolds and is configured to manage fluid flow along a flow path extending between the respective manifold and the adsorbent material.

In addition, the system or method may include certain features to enhance the operation of the system or method. For example, the plurality of valves may comprise one or more poppet valves; the plurality of manifolds and/or the plurality of adsorbent bed units may be configured to operate at pressures between 0.1 bar absolute (bara) and 100 bara; the system may include a heating unit disposed upstream of the purge manifold and downstream of the external gas storage vessel, wherein the heating unit is configured to heat the external gas stream to a temperature in the range between a temperature in the range between a temperature in the range between 450° F. and the gaseous feed stream temperature or in the range between 450° F. and greater than 100° F. of the gaseous feed stream temperature; the system may include a conditioning unit disposed downstream of the purge product manifold and upstream of the external gas storage vessel, wherein the conditioning unit is configured to remove one or more contaminants from the purge product stream; the plurality of manifolds may further comprise a blowdown manifold configured to pass a blowdown stream from the plurality of adsorbent bed units during a blowdown step; and the system may include a liquefied natural gas process unit in fluid communication with the adsorbent bed unit and configured to receive the product stream and separate the product stream into a final product stream and a flash fuel stream, wherein the flash fuel stream is passed to the purge manifold. Further, the external gas stream comprises a nitrogen stream comprising predominately nitrogen with less than 0.1 ppm of water, or may comprise a nitrogen stream comprising predominately nitrogen with less than 10 ppm of water. The external gas stream may be a nitrogen containing stream having greater than one volume percent nitrogen based on the total volume of the feed stream. Also, the method may include mixing a slip stream from the downstream process with the external gas stream prior to performing the purge step and/or adjusting the amount of external gas stream utilized in the performing a purge step based on the amount of the slip stream from the downstream process. The slip stream may be an overhead stream, such as overhead stream from NGL or fuel from LNG.

In other certain embodiments, the startup mode for the swing adsorption process may be integrated with downstream equipment and processes. The downstream equipment and processes may include control freeze zone (CFZ) applications, niotrogen removal unit (NRU), cryogenic NGL recovery applications, LNG applications, and other such applications. Each of these different applications may include different specifications for the feed stream in the respective process. For example, the startup process may involve dehydration upstream of a cryogenic NGL process or an LNG process and may be integrated with the respective downstream equipment. As another example, the startup process may involve $CO_2$ removal upstream of a cryogenic NGL process or the LNG process and may be integrated with respective downstream equipment. The startup method may include using an external medium as part of the process, which may be a dry nitrogen stream. Further, the startup mode may be integrated with downstream processes, such as cryogenic NGL processes and/or LNG processes. In addition, the startup mode process may involve performing the startup mode cycle with minimal flaring or no flaring.

In certain embodiments, the system utilizes a combined swing adsorption process, which combines TSA and PSA, for treating of pipeline quality natural gas to remove contaminants for the stream to satisfy LNG specifications. The swing adsorption process, which may be a rapid cycle process, is used to treat natural gas that is at pipeline specifications (e.g., a feed stream of predominately hydrocarbons along with less than or equal to about 2% volume $CO_2$ and/or less than or equal to 4 ppm $H_2S$) to form a stream satisfying the LNG specifications (e.g., less than 50 ppm $CO_2$ and less than about 4 ppm $H_2S$). The product stream, which may be the LNG feed stream, may have greater than 98 volume percent hydrocarbons based on the total volume of the product stream, while the $CO_2$ and water content are below certain thresholds. The LNG specifications and cryogenic NGL specifications may involve the $CO_2$ content to be less than or equal to 50 ppm, while the water content of the stream may be less than 0.1 ppm. Further, the gaseous feed stream may include hydrocarbons and $H_2O$. For example, the gaseous feed stream may be that the $H_2O$ is in the range of 0.2 parts per million volume to saturation levels in the gaseous feed stream or the $H_2O$ is in the range of 100 parts per million volume to 1500 parts per million volume.

In certain aspects, as described further below, the present techniques may involve using a high temperature stream that is provided to the adsorbent beds as part of the purge step to heat the adsorbent bed. The stream, which may be referred to as the purge stream (e.g., the external stream), may be heated to temperature may be less than 550° F., may be less than 500° F., less than 450° F. or may be less than 350° F., and may be greater than 50° F. of the gaseous feed stream temperature, greater than 100° F. of the gaseous feed stream temperature or greater than 250° F. of the gaseous feed stream temperature. For example, the stream used during the purge step of the startup mode cycle may be a temperature in the range between 500° F. and greater than 50° F. of the gaseous feed stream temperature, in the range between 450° F. and the gaseous feed stream temperature, in the range between a temperature in the range between 450° F. and greater than 100° F. of the gaseous feed stream temperature or 400° F. and greater than 200° F. of the gaseous feed stream temperature. The stream (purge stream or external stream) pressure may be in the range between 0.01 bara and 100 bara, between 1 bara and 80 bara, or between 2 bara and 50 bara.

Further, the present techniques may not remove all of the contaminant (e.g., $H_2O$ and $CO_2$) adsorbed in the bed during the purge step of the startup mode process, but remove a portion of the contaminants such that the product end of the adsorbent bed has a contaminant loading sufficiently low to provide a product stream with less than specifications. Accordingly, the product end of the adsorbent bed may be maintained nearly free of contaminants (e.g., the $CO_2$ loading for the region near the product end is less than 1 millimole per gram (mmol/g), less than 0.5 mmol/g or less than 0.1 mmol/g). The loading level of contaminant may be lower on the feed side of the adsorbent bed during the purge step, but the length of adsorbent bed that contains contaminants is reduced during the purge step. For example, a feed region may be a specific portion of the adsorbent bed from the feed end of the adsorbent bed to 10% of the bed length, from the feed end of the adsorbent bed to 25% of the bed length or from the feed end of the adsorbent bed to 40% of the bed length. The product region may be a specific portion of the adsorbent bed from the product end of the adsorbent bed to 10% of the bed length, from the product end of the adsorbent bed to 25% of the bed length or from the product end of the adsorbent bed to 40% of the bed length. The movement of the contaminants front back during purge step and forward during the adsorption step is the basis of the swing capacity of the process. In part, this is achieved by using a limited, cost effective quantity of purge gas in the purge steam along with the heating of the adsorbent bed in this process and configuration.

The present techniques may involve using two or more adsorbent beds, which are operated on similar cycle that are performing different steps of the cycles (e.g., not synchronized with each other) to maintain a steady flow of fluids for the various streams (e.g., feed stream, product stream, heating stream, and purge stream).

Further, in other embodiments, the pressure of the different streams may be varied. For example, the feed stream may involve a feed pressure that is within the in the range between 0.01 bara and 100 bara, between 1 bara and 80 bara, or between 2 bara and 50 bara, but is not necessarily limited to this range. The feed temperature may be in the range between 0° F. and 200° F., in the range between 20° F. and 175° F. or in the range between 40° F. and 150° F. The blowdown pressure, heating pressure, and purge pressure may be adjusted depending on the cycle, may depend upon the adsorbent material being utilized and/or may range from vacuum to feed pressure. For example, if the adsorbent material is zeolite 4A, the blowdown pressure range may be between 0.01 bara to 50 bara, or more preferably in a range between 1 bara and 15 bara. This example may depend on the feed concentration of $CO_2$. Also, in other embodiments, the depressurization steps may be adjusted such that the pressure swing is achieved in stages to vary the amount of methane desorbing during each step, if any. Additionally, a heating loop may be introduced and the heating pressure in the heating loop may be operated at a pressure different from the purge pressure or blowdown pressure in the respective steps. Also, certain embodiments may include no pressure swing, but may rely upon temperature swing for the regeneration step. Similarly, in the other embodiments, no temperature swing may be performed and the regeneration step may be performed by pressure swing.

Furthermore, the above process may be used for startup mode processes that separate two or more contaminants from the feed stream (e.g., two swing adsorption processes operated in series with each other). For example, the feed stream may subjected to a dehydration swing adsorption process, then a $CO_2$ removal swing adsorption process, and the resulting product may be subjected to a downstream process, such as cryogenic NGL or LNG recovery. The startup mode for the dehydration and the $CO_2$ removal processes may involve external startup processes. As one example, the dehydration process may involve the external startup process. Then, once the product stream satisfies the desired specification for water removal, the product stream may be used by the $CO_2$ removal as part of the external startup stream. Alternatively, the dehydration process may involve the external startup process and the $CO_2$ removal process may perform another external startup mode process and may mix the purge stream with the feed stream to the dehydration process.

In certain configurations, an integrated rapid cycle adsorption system may be utilized to remove multiple contaminants (e.g., water and $CO_2$). Suitable adsorbent material or adsorbent layers may be utilized to provide the dehydration, which may be the same or different from the adsorbent material used to in the removal of other contaminants, such as $CO_2$.

Moreover, the present techniques may include a specific process flow during normal operation mode to remove contaminants, such as $CO_2$ and/or water. For example, the process may include an adsorbent step and a regeneration step, which form the cycle. The adsorbent step may include passing a gaseous feed stream at a feed pressure and feed temperature through an adsorbent bed unit to separate one or more contaminants from the gaseous feed stream to form a product stream. The feed stream may be passed through the adsorbent bed in a forward direction (e.g., from the feed end of the adsorbent bed to the product end of the adsorbent bed). Then, the flow of the gaseous feed stream may be interrupted for a regeneration step. The regeneration step may include one or more depressurization steps, one or more heating steps, and/or one or more purge steps. The depressurization steps, which may be or include a blowdown step, may include reducing the pressure of the adsorbent bed unit by a predetermined amount for each successive depressurization step, which may be a single step and/or multiple steps. The depressurization step may be provided in a forward direction or may preferably be provided in a countercurrent direction (e.g., from the product end of the adsorbent bed to the feed end of the adsorbent bed). The heating step may include passing a heating stream into the adsorbent bed unit, which may be a recycled stream through the heating loop and is used to heat the adsorbent material. The purge step may include passing a purge stream into the adsorbent bed unit, which may be a once through purge step and the purge stream may be provided in countercurrent flow relative to the feed stream. The purge stream may be provided at a purge temperature and purge pressure, which may include the purge temperature and purge pressure being similar to the heating temperature and heating pressure used in the heating step. Then, the cycle may be repeated for additional streams. Additionally, the process may include one or more re-pressurization steps after the purge step and prior to the adsorption step. The one or more re-pressurization steps may be performed, wherein the pressure within the adsorbent bed unit is increased with each re-pressurization step by a predetermined amount with each successive re-pressurization step. The cycle duration for normal operation mode may be for a period greater than 1 second and less than 600 seconds, for a period greater than 2 second and less than 300 seconds, for a period greater than 2 second and less than 180 seconds, for a period greater than 5 second and less than 150 seconds or for a period greater than 5 second and less than 90 seconds.

In other configurations, the startup mode may involve lower flow rates and longer cycles. For example, the initial flow rate may be 25% of the normal flow rate utilized during normal operations, which may have a startup mode cycle time of four times the normal operation model cycle time. This initial flow rate may be increased in a steady manner or in various increments until the normal operation mode is reached. By way of example, the startup mode cycle duration may be for a period greater than 1 second and less than 2400 seconds, for a period greater than 1 second and less than 1500 seconds, for a period greater than 1 second and less than 600 seconds, for a period greater than 2 second and less than 800 seconds, for a period greater than 2 second and less than 400 seconds, for a period greater than 5 second and less than 150 seconds or for a period greater than 5 second and less than 90 seconds.

In yet other configurations, the startup mode may involve installation of adsorbent beds that are partially or completely devoid of the contaminant being removed. By way of example, if the swing adsorption process is primarily configured to remove water, then a partially or totally dehydrated adsorbent bed may be installed in the system. During the start mode, a feed stream is passed to the adsorbent bed, which may be as a wet gas, and a product stream, which may be a dry stream, is conducted away and may be used as a purge stream to a different adsorbent bed. Alternatively, another method may involve installation of an adsorbent bed in the swing adsorption process that is treated or conditioned such that the contaminant replaces a different molecule that is already adsorbed on the adsorbent bed. By way of example, if the swing adsorption process is primarily configured to remove $CO_2$, then the adsorbent bed may include adsorbed particles, such as water, which may be installed in the system. During the start mode, a feed stream is passed to the adsorbent bed, which may include the $CO_2$ contaminants, and a product stream may be conducted away and may be used as a purge stream to a different adsorbent bed.

In certain configurations, a process for removing contaminants from a gaseous feed stream with a swing adsorption process is described. The process comprising: a) performing a purge step, wherein the purge step comprises passing an external gas stream through an adsorbent bed unit to remove one or more contaminants from an adsorbent bed within a housing of the adsorbent bed unit to form a purge product stream; b) performing one or more adsorption steps, wherein each of the one or more adsorption steps comprise passing a gaseous feed stream through an adsorbent bed unit having an adsorbent bed to separate one or more contaminants from the gaseous feed stream to form a product stream; c) determining whether the product stream is within a specification for a contaminant; d) if the product stream is within the specification, passing the product stream to a downstream process; and e) if the product stream is not within the specification, repeating the steps a) to d) for at least one additional cycle.

The process may include various configuration changes to enhance the operations. For example, the process may further comprising mixing a slip stream from the downstream process with the external gas stream prior to performing the purge step; adjusting the amount of external gas stream utilized in the performing a purge step based on the amount of the slip stream from the downstream process; heating the external gas stream prior to passing the external gas stream through an adsorbent bed unit; wherein the external gas stream is heated to a temperature in the range between 500° F. and greater than 50° F. of the gaseous feed stream temperature or to a temperature in the range between 450° F. and the gaseous feed stream temperature; heating the purge product stream, wherein the purge product stream is heated to a temperature 10° F. greater than the dew point of the purge product stream; separating one or more contaminants from the purge product stream to form conditioned purge product stream and mixing the conditioned purge product stream with external gas source stream to form the external gas stream; wherein the purge stream is passed in a countercurrent direction relative to the direction of the feed stream and wherein a temperature differential exists at the end of the purge step in a range between 100° F. and 400° F., wherein the temperature differential is the difference in temperatures between a feed end of the adsorbent bed and a product end of the adsorbent bed; wherein the cycle duration is for a period greater than 1 second and less than 2400 seconds or is greater than 2 seconds and less than 800 seconds; wherein the gaseous feed stream is a hydrocarbon containing stream having greater than one volume percent hydrocarbons based on the total volume of the feed stream; wherein the gaseous feed stream comprises hydrocarbons and $CO_2$, wherein the $CO_2$ content is in the range of two hundred parts per million volume and less than or equal to about 2% volume of the gaseous feed stream; wherein the adsorbent bed unit is configured to lower the carbon dioxide ($CO_2$) level to less than 50 parts per million; wherein the gaseous feed stream comprises hydrocarbons and $H_2O$, wherein the $H_2O$ is in the range of 0.2 parts per million volume to saturation levels in the gaseous feed stream; wherein the gaseous feed stream comprises hydrocarbons and $H_2O$, wherein the $H_2O$ is in the range of 100 parts per million volume to 1500 parts per million volume; passing the product stream from the adsorbent bed unit to a liquefied natural gas (LNG) process unit and separating a flash fuel stream from the LNG process unit to be utilized as at least a portion of the purge stream; passing the product stream from the adsorbent bed unit to a cryogenic natural gas liquid recovery (NGL) process unit and separating an overhead stream from the NGL process unit to be utilized as at least a portion of the purge stream; wherein the external gas stream is a nitrogen containing stream having greater than one volume percent nitrogen based on the total volume of the feed stream; wherein the external gas stream comprises a predominately nitrogen stream comprising less than 0.1 ppm of water or less than 10 ppm of water; and/or wherein the external gas stream comprises at least one of nitrogen, methane, helium, hydrogen or any combination thereof.

In yet other configurations, a cyclical swing adsorption system is described. The system may include: a plurality of manifolds, wherein the plurality of manifolds comprise a feed manifold configured to pass a feed stream to the plurality of adsorbent bed units during an adsorption step, a product manifold configured to pass a product stream from the plurality of adsorbent bed units during the adsorption step, a purge manifold configured to pass a purge stream to the plurality of adsorbent bed units during a regeneration step, a purge product manifold configured to pass a purge product stream from the plurality of adsorbent bed units during the regeneration step, each manifold of the plurality of manifolds is associated with one swing adsorption process step of a plurality of swing adsorption process steps; a plurality of adsorbent bed units coupled to the plurality of manifolds, each of the adsorbent bed units comprising: a housing; an adsorbent material disposed within the housing; a plurality of valves, wherein at least one of the plurality of valves is associated with one of the plurality of manifolds and is configured to manage fluid flow along a flow path extending between the respective manifold and the adsorbent material; an external gas bypass valve in fluid communication with purge manifold and configured to provide a flow passage for an external gas stream from an external gas storage vessel to the purge manifold in a startup mode position and configured to block the flow passage of the external gas stream from the external gas storage vessel to the purge manifold in a normal operation mode position.

The system may include various configuration changes to enhance the operations. For example, the cyclical swing adsorption system may include that the plurality of valves comprise one or more poppet valves; may include that the plurality of adsorbent bed units are configured to operate at pressures between 0.1 bar absolute (bara) and 100 bara; may further include a heating unit disposed upstream of the purge manifold and downstream of the external gas storage vessel, wherein the heating unit is configured to heat the external gas stream to a temperature in the range between a temperature in the range between 450° F. and the gaseous feed stream temperature; may further include a conditioning unit disposed downstream of the purge product manifold and upstream of the external gas storage vessel, wherein the conditioning unit is configured to remove one or more contaminants from the purge product stream; may include that the plurality of manifolds further comprise a blowdown manifold configured to pass a blowdown stream from the plurality of adsorbent bed units during a blowdown step; may further include a liquefied natural gas process unit in fluid communication with the adsorbent bed unit and configured to receive the product stream and separate the product stream into a final product stream and a flash fuel stream, wherein the flash fuel stream is passed to the purge manifold; may further comprising a cryogenic natural gas liquid recovery (NGL) process unit in fluid communication with the adsorbent bed unit and configured to receive the product stream and separate the product stream into a final product stream and a residue gas stream, wherein the residue gas stream is passed to the purge manifold; and/or may further include a heating jacket disposed adjacent to the adsorbent bed unit and configured to heat the adsorbent bed.

In one or more embodiments, the present techniques can be used for any type of swing adsorption process. Non-limiting swing adsorption processes for which the present techniques may be used include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes. For example, the preferred swing adsorption process may include a combined pressure swing adsorption and temperature swing adsorption, which may be performed as a rapid cycle process. Exemplary swing adsorption processes are further described in U.S. Patent Ser. Nos. 62/213,262; 62/213,267; 62/213,270; 62/213,273; 62/246,916; 62/246,920; and 62/246,922 and U.S. Patent Application Publication Nos. 2008/0282892, 2008/0282887, 2008/0282886, 2008/0282885, 2008/0282884 and 20140013955, which are each herein incorporated by reference in their entirety.

Further still, in one or more embodiments, a variety of adsorbent materials may be used to provide the mechanism for the separations. Examples include zeolite 3A, 4A, 5A, ZK4 and MOF-74. However, the process is not limited to these adsorbent materials, and others may be used as well. The present techniques may be further understood with reference to the FIGS. 1 to 9 below.

FIG. 1 is a three-dimensional diagram of the swing adsorption system 100 having six adsorbent bed units and interconnecting piping. While this configuration is a specific example, the present techniques broadly relate to adsorbent bed units that can be deployed in a symmetrical orientation, or non-symmetrical orientation and/or combination of a plurality of hardware skids. Further, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits (e.g., conduit 104) for managing the flow of fluids through, to or from the adsorbent bed within the adsorbent bed unit 102. These conduits from the adsorbent bed units 102 may be coupled to a manifold (e.g., manifold 106) to distribute the flow to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. In particular, the adsorbent bed units may include startup mode equipment, such as one or more heating units (not shown), one or more external gas source manifolds, which may be one of the manifolds 106) and one or more expanders, as noted further below, which is used as part of the startup mode for the adsorbent beds. Further, the adsorbent bed unit may also include one or more equalization vessels, such as equalization vessel 108, which are dedicated to the adsorbent bed unit and may be dedicated to one or more step in the swing adsorption process. The equalization vessel 108 may be used to store the external stream, such as nitrogen for use in the startup mode cycle.

As an example, which is discussed further below in FIG. 2, the adsorbent bed unit 102 may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises a solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
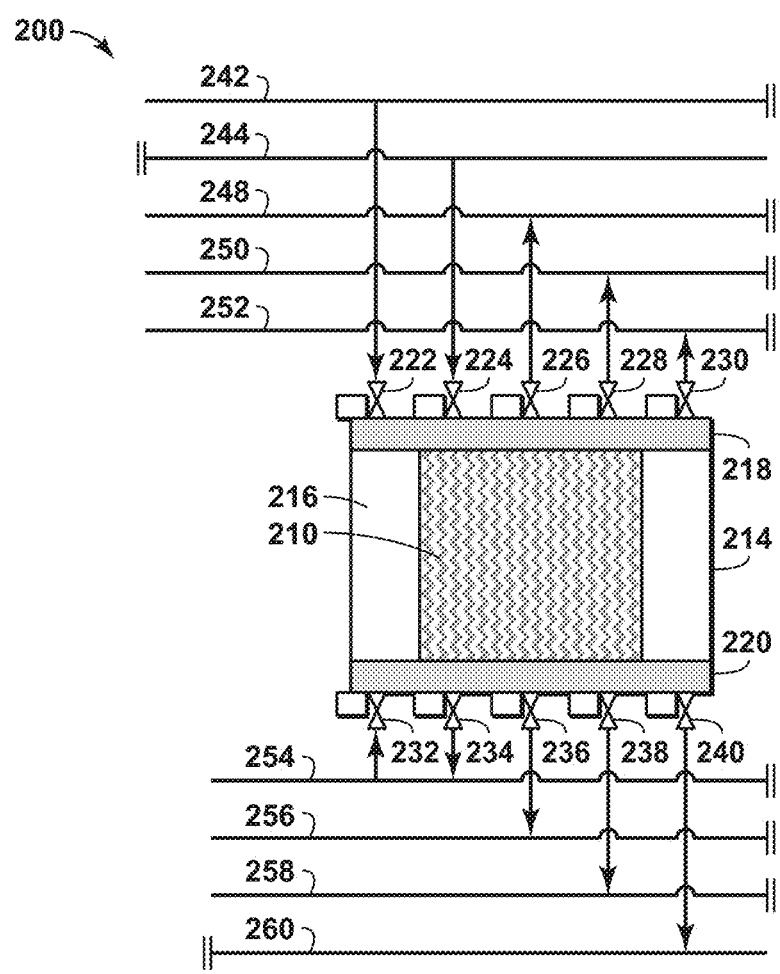
FIG. 2 is a diagram of a portion of an adsorbent bed unit having associated valve assemblies and manifolds in accordance with an embodiment of the present techniques.

FIG. 2 is a diagram of a portion of an adsorbent bed unit 200 having valve assemblies and manifolds in accordance with an embodiment of the present techniques. The portion of the adsorbent bed unit 200, which may be a portion of the adsorbent bed unit 102 of FIG. 1, includes a housing or body, which may include a cylindrical wall 214 and cylindrical insulation layer 216 along with an upper head 218 and a lower head 220. An adsorbent bed 210 is disposed between an upper head 218 and a lower head 220 and the insulation layer 216, resulting in an upper open zone, and lower open zone, which open zones are comprised substantially of open flow path volume. Such open flow path volume in adsorbent bed unit contains gas that has to be managed for the various steps. The housing may be configured to maintain a pressure from 0 bara (bar absolute) to 150 bara within the interior region.

The upper head 218 and lower head 220 contain openings in which valve structures can be inserted, such as valve assemblies 222 to 240, respectively (e.g., poppet valves). The upper or lower open flow path volume between the respective head 218 or 220 and adsorbent bed 210 can also contain distribution lines (not shown) which directly introduce fluids into the adsorbent bed 210. The upper head 218 contains various openings (not show) to provide flow passages through the inlet manifolds 242 and 244 and the outlet manifolds 248, 250 and 252, while the lower head 220 contains various openings (not shown) to provide flow passages through the inlet manifold 254 and the outlet manifolds 256, 258 and 260. Disposed in fluid communication with the respective manifolds 242 to 260 are the valve assemblies 222 to 240. If the valve assemblies 222 to 240 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

In swing adsorption processes, the cycle involves two or more steps that each has a certain time interval, which are summed together to be the cycle time or cycle duration. These steps include regeneration of the adsorbent bed following the adsorption step using a variety of methods including pressure swing, vacuum swing, temperature swing, purging (via any suitable type of purge fluid for the process), and combinations thereof. As an example, a PSA cycle may include the steps of adsorption, depressurization, purging, and re-pressurization. When performing the separation at high pressure, depressurization and re-pressuriza-tion (which may be referred to as equalization) may be performed in multiple steps to reduce the pressure change for each step and enhance efficiency. In some swing adsorption processes, such as rapid cycle swing adsorption processes, a substantial portion of the total cycle time is involved in the regeneration of the adsorbent bed. Accordingly, any reductions in the amount of time for regeneration results in a reduction of the total cycle time. This reduction may also reduce the overall size of the swing adsorption system.

Further, in startup mode for the swing adsorption process, one or more of the manifolds and associated valves may be utilized as a dedicated flow path for one or more startup streams. For example, during the adsorption or feed step, the manifold 242 and valve assembly 222 may be utilized to pass the feed gas stream to the adsorbent bed 210, while the valve assembly 236 and manifold 256 may be used to conduct away the product stream from the adsorbent bed 210. During the regeneration or purge step, the manifold 244 and valve assembly 224 may be utilized to pass the external gas stream to the adsorbent bed 210, while the valve assembly 236 and manifold 256 may be used to conduct away the purge product stream from the adsorbent bed 210. Accordingly, the manifold 244 and valve assembly 224 may be utilized for startup mode processes, but remain inactive during normal operation mode. As may be appreciated, the purge stream may be configured to flow counter current to the feed stream in other embodiments.

Alternatively, the startup mode for the swing adsorption process may involve sharing one or more of the manifolds and associated valves during the normal operation mode and during startup mode. For example, the manifold 242 and valve assembly 222 may be utilized to feed the gaseous feed stream to the adsorbent bed 210 during startup mode and during normal operations, while the valve assembly 236 and manifold 256 may be used to conduct away the product stream from the adsorbent bed 210 may be used to conduct away the product stream during startup mode and during normal operation mode. During the regeneration or purge step, the manifold 254 and valve assembly 232 may be utilized to pass the external gas stream to the adsorbent bed 210 for startup mode and to pass the purge stream to the adsorbent bed 210 for normal operation mode, while the valve assembly 226 and manifold 248 may be used to conduct away the purge product stream from the adsorbent bed 210 during startup mode and normal operation mode. Beneficially, this configuration may be utilized to lessen any additional valves or connections for startup mode for adsorbent bed unit configurations that are subject to space limitations on the respective heads.

During normal operation mode, a gaseous feed stream may be subject to various processes to form a NGL stream or a LNG stream. For example, the process may include a mercury removal unit to remove mercury from an input stream; a filter to remove both particular and liquid droplets; a swing adsorption unit to remove one or more contaminants, such as $H_2O$, $CO_2$ and sulfur containing species; a LNG process unit or NGL process unit to process the resulting stream into a final product that may be used for sales, shipment or storage. In addition, the configuration may include one or more of a heating loop, a compressor, a heating unit and/or a storage vessel.

As noted above, the present techniques include various procedures that may be utilized for the startup mode of the swing adsorption process. The startup mode may include an external startup mode. The external startup mode may include performing an adsorption step and then a regeneration step for each of the adsorbent beds. The adsorption step may include passing a gaseous feed stream through the adsorbent bed to adsorb one or more contaminants from the gaseous feed stream and conducting away the resulting product stream from the adsorbent bed unit. The resulting product stream may be passed to downstream processing equipment. The regeneration step may include passing an external stream through the adsorbent bed to remove one or more contaminants from the adsorbent bed unit (e.g., a portion of the contaminants within the adsorbent bed unit or within the voids of the adsorbent bed) and conduct away the purge product stream from the adsorbent bed unit. The purge product stream may be set to flare or may be combined with fuel gas.

Figure 3:
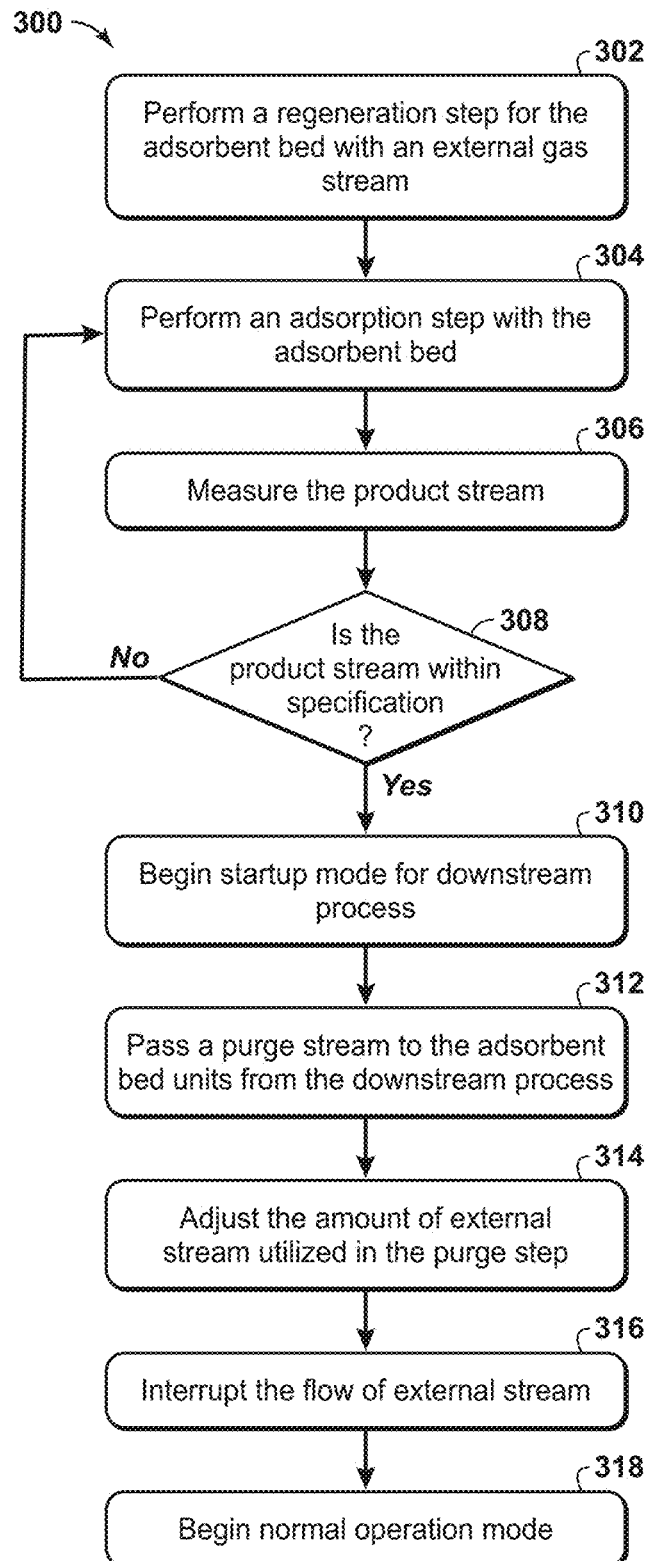
FIG. 3 is an exemplary flow chart for performing an external startup mode of a swing adsorption process in accordance with an embodiment of the present techniques.

As an example, FIG. 3 is an exemplary flow chart for performing an external startup mode of a swing adsorption process in accordance with an embodiment of the present techniques. In this flow chart 300, the startup mode process may involve the use of an external gas stream to remove one or more contaminants from the adsorbent beds as part of the startup mode cycle. Further, the startup mode process may include operating two or more adsorbent bed units, which may each be performing different steps in the startup mode cycle. For each of the adsorbent bed units, the swing adsorption process involves a startup mode process using an external stream, as shown in blocks 302 to 308, which is described as being performed for a single adsorbent bed unit for simplicity. Then, the adsorbent bed units may be used with the downstream equipment, as shown in blocks 310 to 316, and normal operations mode are begun, as shown in block 318. The external gas stream may include nitrogen and/or methane, as noted above. The external stream may comprise predominately nitrogen and/or methane with less than 0.1 ppm of water, or less than 10 ppm of water. The external gas stream may be a nitrogen containing stream having greater than one volume percent nitrogen based on the total volume of the feed stream.

The process begins by performing the startup mode process for the adsorbent bed units of the swing adsorption process, as shown in blocks 302 to 308. At block 302, a regeneration step is performed for the adsorbent bed with an external stream. The external stream may include nitrogen or methane and may be a dry stream (e.g., less than 10 ppm of water, less than 1 ppm of water, or less than 0.1 ppm of water). The regeneration step, which may be one or more purge steps may include passing the external stream through the adsorbent bed to create a purge product stream that is conducted away from the adsorbent bed unit. The product purge stream may include the external stream and a portion of the contaminants within the adsorbent bed. This product purge stream may be intermingled with a fuel gas stream or may be flared. Further, the external stream may be subjected to a heating step prior to being passed to the adsorbent bed. The heating step may heat the external stream to a temperature less than 550° F., less than 500° F., less than 450° F. or less than 350° F., and may be greater than 50° F. of the gaseous feed stream temperature, greater than 100° F. of the gaseous feed stream temperature or greater than 250° F. of the gaseous feed stream temperature. For example, the external stream used during the purge step may be a temperature in the range between 500° F. and greater than 50° F. of the gaseous feed stream temperature, in the range between a temperature in the range between 450° F. and greater than 100° F. of the gaseous feed stream temperature, in the range between 450° F. and the gaseous feed stream temperature or 400° F. and greater than 200° F. of the gaseous feed stream temperature. The heating of the external stream may include passing the stream through a heat exchanger or similar heating unit to increase the temperature of the external stream. At block 304, an adsorption step is performed for the adsorbent bed. The adsorption step may include passing a gaseous feed stream through the adsorbent bed to remove one or more contaminants from the gaseous feed stream and to create a product stream that is conducted away from the adsorbent bed unit. At block 306, the product stream may be measured. The product stream may be measured by taking samples, using a moisture analyzer, using a gas chromatograph or using another gas component analysis equipment. Then, at block 308, a determination may be made whether the product stream is within specification. This determination may include analyzing the product stream to determine the level of one or more of the contaminants within the product stream. If the product stream is within specification (e.g., contaminants are at or below a specific threshold), the product stream may be passed to downstream processes. However, if the product stream is not within specifications (e.g., contaminants are above a specific threshold), the product stream may be recycled to be intermingled with the gaseous feed stream and utilized as part of the adsorption step, as shown in block 304.

Once the adsorbent bed units are passing the product stream to the downstream process, the product stream may be used with the downstream equipment, as shown in blocks 310 to 316. At block 310, the startup mode for the downstream equipment may begin. The startup mode for the downstream equipment may involve various steps prior to the passing of product stream to the downstream equipment or may begin once the product stream is passed to the downstream equipment. The downstream processes may include a CFZ process, a cryogenic NGL recovery process, or an LNG process, with the associated equipment for each. Further, during the downstream startup mode sequence, the adsorbent bed units may continue to utilize the external stream for the purge step. At block 312, a purge stream may be passed to the adsorbent bed units from the downstream process. The purge stream may include an overhead stream or a slip stream from the downstream process. By way of example, the purge stream from an NGL facility may be the demethanizer overhead, or the purge stream may be a fuel gas stream for an LNG facility. Then, at block 314, the amount of external stream utilized in the purge step may be adjusted. The adjustment may be based on the amount of the purge stream being provided to the adsorbent bed units. For example, the flow rate of the external stream may be lowered by 10%, 50%, or 90% based on the amount of purge stream from the downstream processes and the desired flow rate. At block 316, the flow of the external stream may be interrupted. The flow of the external stream may be interrupted once the downstream process is producing a sufficient amount of purge stream at conditions close to steady operating conditions.

Once the startup mode process is complete, the normal operation mode may begin, as shown in block 318. At block 318, normal operation mode is begun. The normal operation mode may include passing the gaseous feed stream is passed to the adsorbent bed units for the swing adsorption process to remove contaminants and pass the product stream to the downstream process. Then, the downstream process may pass the product stream through the various downstream equipment to produce a final product stream. The downstream process may also pass a purge stream to the swing adsorption process, which may be utilized during the regeneration step to remove contaminants from the adsorbent beds within the adsorbent bed units.

As a specific example, the feed stream may be a natural gas stream that predominately contains hydrocarbons, the external stream may be a nitrogen stream and the contaminants within the adsorbent bed may be water. During the purge step for the respective adsorbent bed, the nitrogen stream is passed through the adsorbent bed and water interacts with the nitrogen stream to form the purge product stream, which includes the nitrogen and the portion of the water removed from the adsorbent bed.

In addition, the product stream from the adsorbent bed units may be utilized in the startup mode process for one or more downstream units, such as a demethanizer or a liquefaction train. As the downstream processes and units are being started, the spent adsorbent beds may be regenerated using the dry nitrogen stream as the purge stream. The dry nitrogen stream may be heated. Alternatively, a heated slip stream from the product side may also be used to regenerate the adsorbent beds during the purge step. Once the downstream processes begin normal operation mode, the purge stream may be adjusted to be provided from a residue gas stream, a fuel gas stream or other suitable stream from one of the downstream processes.

In certain embodiments, the purge product stream may be subjected to processes to remove the contaminants from the external stream, such that the cleaned purge product stream may be recycled to the adsorbent bed units as the external stream or intermingled with the external stream. For example, if the external stream is a nitrogen stream and the contaminant is water, the purge product stream may be heated and then may be subjected to a pressure drop to separate the water from the nitrogen in the purge product stream. In this manner, the nitrogen may be regenerated and recycled to the adsorbent beds to remove additional water from the adsorbent beds during a subsequent purge step.

As further enhancements, the operating conditions may be adjusted during the external startup mode to manage the removal of contaminants from the adsorbent beds. By way of example, flow rate may be in a range between 25 and 1000 million standard cubic feet per day (MSCFD) during normal operation mode, while the flow rate may be in the range between 6.25 and 500 MSCFD for startup mode. The flow rate may be increased during subsequent purge steps until normal operation mode flow rates are reached. Also, the pressure range of the external stream may be in a pressure range between atmospheric pressure and fifty psi above atmospheric pressure. In addition, the temperature of the external stream may be within a temperature range between 20° Celsius (C) above atmospheric temperature and 150° C. above atmospheric temperature. Further, the temperature of the external stream may be less than 550° F., less than 500° F., less than 450° F. or less than 350° F., and may be the gaseous feed stream temperature, greater than 50° F. of the gaseous feed stream temperature, greater than 100° F. of the gaseous feed stream temperature or greater than 250° F. of the gaseous feed stream temperature. For example, the external stream used during the purge step may be a temperature in the range between 500° F. and greater than 50° F. of the gaseous feed stream temperature, in the range between a temperature in the range between 450° F. and the gaseous feed stream temperature; in the range between 450° F. and greater than 100° F. of the gaseous feed stream temperature or 400° F. and greater than 200° F. of the gaseous feed stream temperature.

To support the external startup mode process, a configuration of the swing adsorption process may include additional bypass conduits and manifold to pass the external stream to the adsorbent bed units during the purge step. The external stream may be provided from an external source vessel through an external source conduit that is in fluid communication with purge manifold. In addition, the configuration may include one or more heating units that are upstream of the purge manifold and configured to heat the external stream prior to passing through the adsorbent bed units and/or that are downstream of the purge product manifold and configured to heat the purge product stream. The heating unit may include a heat exchanger, a furnace, or the like. The configuration may also include one or more separation units configured to separate one or more contaminants from the purge product stream. The separation units may be a flash separation vessel that is configured to lower the pressure of the stream to separate the contaminants from the remaining portion of the purge product stream or may be an adsorption unit that interacts with the contaminants to separates the contaminants from the remaining portion of the purge product stream. The contaminants may be conducted away from the process, while the remaining portion of the purge product stream may be passed to one or more regeneration units. The regeneration units may be utilized to further purify the remaining portion of the purge product stream and/or compress the remaining portion of the purge product stream to form the external stream that is passed to the adsorbent beds.

In certain embodiments, the external stream may be further conditioned prior to being provided to a subsequent adsorbent bed unit during its regeneration step, as the purge stream. The heating step may heat the external stream to a temperature less than 550° F., less than 500° F., less than 450° F. or less than 350° F., and may be greater than 50° F. of the gaseous feed stream temperature, greater than 100° F. of the gaseous feed stream temperature or greater than 250° F. of the gaseous feed stream temperature. For example, the external stream used during the purge step may be a temperature in the range between 500° F. and greater than 50° F. of the gaseous feed stream temperature, in the range between a temperature in the range between 450° F. and the gaseous feed stream temperature; in the range between 450° F. and greater than 100° F. of the gaseous feed stream temperature or 400° F. and greater than 200° F. of the gaseous feed stream temperature. The heating of the external stream may include passing the stream through a heat exchanger or similar heating unit to increase the temperature of the external stream. Further, the external stream may be subjected to a depressurization step prior to being passed to the adsorbent bed unit performing its regeneration step. The depressurization step, which may be prior to the heating step or following the heating step, may lower the pressure of the external stream to a pressure in the range from between 0.1 bar absolute (bara) and 100 bara, which is lower than the pressure of the external stream prior to the depressurization step. The pressure may be lowered by at least 10%, by at least 20% or at least 30% relative to the pressure of the product stream exiting the adsorbent bed. The depressurizing of the external stream may include passing the stream through an expander or flash separation vessel to lower the pressure of the external stream.

As further enhancements, the operating conditions may be adjusted during the startup mode to manage the removal of contaminants from the adsorbent bed units. By way of example, the flow rate may be in a range between 25 and 1000 million standard cubic feet per day (MSCFD) during normal operation mode, while the flow rate may be in the range between 6.25 and 500 MSCFD for startup mode. The flow rate may be increased during subsequent purge steps until normal operation mode flow rates are reached. Also, the pressure range of the external stream may be in a pressure range between atmospheric pressure and fifty psi above atmospheric pressure. In addition, the temperature of the external stream may be within a temperature range between 20° Celsius (C) above atmospheric temperature and 100° Celsius (C) above atmospheric temperature.

In addition, the purge product may be subject to conditioning steps, such as for recovering hydrocarbons from the regeneration step. For example, the purge product stream may be cooled or compressed to remove contaminants and may be recycled to be at least a portion of the feed stream or to be at least a portion of the product stream. By way of example, a flash separation may be utilized to remove contaminants. In other configurations, the purge product stream is heated to a temperature 5° F. greater than the dew point of the purge product stream; 10° F. greater than the dew point of the purge product stream; or 20° F. greater than the dew point of the purge product stream. By heating the purge product stream above the dew point, the heated purge product stream may be used in a subsequent process, such as a gas turbine.

To support the startup mode process, a configuration of the swing adsorption process may include additional bypass conduits and manifold to pass the external stream or a portion of the external stream to adsorbent bed units during their regeneration step. The configuration may also include one or more heating units that are upstream of the purge manifold and configured to heat the external stream prior to passing through the adsorbent bed units and/or that are downstream of the purge product manifold and configured to heat the purge product stream. The heating unit may include a heat exchanger, a furnace, or the like. The configuration may also include one or more depressurization units configured to lower the pressure of the external stream. The depressurization units may include one or more expanders and/or one or more separation units. The separation units, which may be a flash separation vessel, may be configured to separate one or more contaminants from the external stream. Further, the configuration may include one or more regeneration units that are configured to purify the purge product stream to remove contaminants from the purge product stream. By way of example, the configuration may include an external gas bypass valve in fluid communication with purge manifold and configured to provide a flow passage for an external gas stream from an external gas storage vessel to the purge manifold in a startup mode position and configured to block the flow passage of the external gas stream from the external gas storage vessel to the purge manifold in a normal operation mode position.

Figure 4:
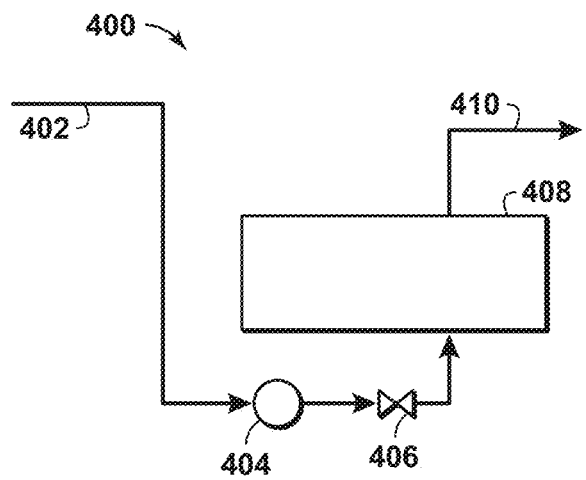
FIG. 4 is an exemplary diagram of a startup mode step in accordance with an embodiment of the present techniques.

Exemplary embodiments of steps that may be performed in the startup mode process are shown in FIGS. 4 to FIG. 9. FIG. 4 is an exemplary diagram 400 of a startup mode step in accordance with an embodiment of the present techniques. In this diagram 400, an adsorbent bed heating step is shown during the adsorption step of the startup mode cycle. In this heating step, a feed stream, which may be a wet gas stream or the external stream, may be passed via conduit 402 to a heating unit 404. The heating unit 404 may be configured to heat the feed stream to a temperature less than 550° F., less than 500° F., less than 450° F. or less than 350° F., and may be the gaseous feed stream temperature, greater than 50° F. of the gaseous feed stream temperature, greater than 100° F. of the gaseous feed stream temperature or greater than 250° F. of the gaseous feed stream temperature. For example, the stream used during the purge step may be a temperature in the range between 500° F. and 50° F., in the range between 450° F. and 100° F. or 400° F. and 200° F. (e.g., at a temperature higher than the feed stream temperature). Then, the heated stream may be passed to a depressurization unit 406. The depressurization unit 406 may be configured to lower the pressure of the heated stream to a pressure in the range of 0.1 bar absolute (bara) and 100 bara, which is lower than the pressure within the stream prior to the depressurization unit 406 or which may lower the pressure by at least 10%, by at least 20% or at least 30% relative to the pressure of the stream prior to the depressurization unit 406. Then, the resulting stream is passed from the depressurization unit 406 to be flared or recycled into the process.

Figure 5A:
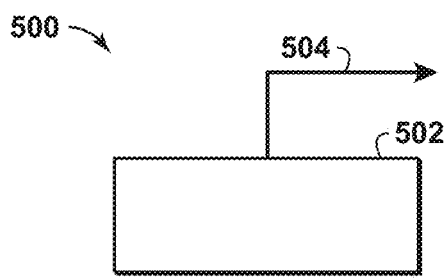
FIGS. 5A and 5B are exemplary diagrams associated with another startup mode step in accordance with an embodiment of the present techniques.
Figure 5B:
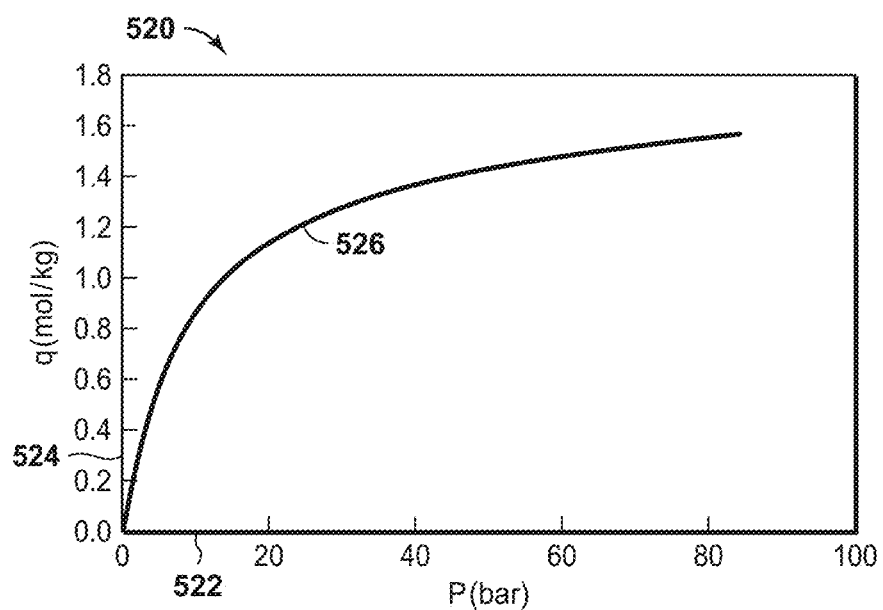

FIGS. 5A and 5B are exemplary diagrams 500 and 520 associated with another startup mode step in accordance with an embodiment of the present techniques. In the diagram 500 of FIG. 5A, a blowdown step is shown. In this blowdown step, a blowdown stream, which may be a portion of the gas within the adsorbent bed unit 502, may be passed via conduit 504 to a flare (not shown). The blowdown step may be utilized to remove a large amount of contaminants, such as water, from the adsorbent bed unit 502.

In FIG. 5B, a diagram 520 of a pressure response 526 is shown along a adsorption axis 522 in moles per kilogram (mol/kg) with respect to a pressure axis 522 in bars. In this diagram 520, the response 526 shows equilibrium loading as a function of the partial pressure. As pressure in the adsorbent bed is reduced, the partial pressure lowers resulting in a lower loading on the adsorbent material. This results in desorption of contaminant from the adsorbent bed which may be conducted away to flare.

Figure 6:
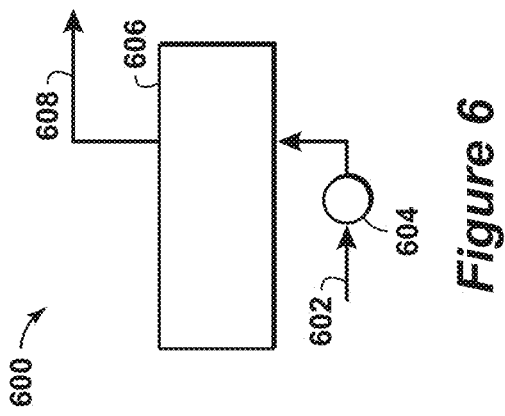
FIG. 6 is an exemplary diagram associated with yet another startup mode step in accordance with an embodiment of the present techniques.

FIG. 6 is an exemplary diagram 600 associated with yet another startup mode step in accordance with an embodiment of the present techniques. In this diagram 600, an external gas purge step is shown. In this external gas purge step, an external gaseous stream, which may be a predominately nitrogen stream, may be passed via conduit 602 to a heating unit 604. The heating unit 604 may be configured to heat the external gas stream to a temperature less than 550° F., less than 500° F., less than 450° F. or less than 350° F., and may be the gaseous feed stream temperature, greater than 50° F. of the gaseous feed stream temperature, greater than 100° F. of the gaseous feed stream temperature or greater than 250° F. of the gaseous feed stream temperature. For example, the external stream used during the purge step may be a temperature in the range between 500° F. and greater than 50° F. of the gaseous feed stream temperature, in the range between a temperature in the range between 450° F. and the gaseous feed stream temperature, in the range between 450° F. and greater than 100° F. of the gaseous feed stream temperature or 400° F. and greater than 200° F. of the gaseous feed stream temperature. Then, the heated external gas stream may be passed to the adsorbent bed unit 606 as a heated purge stream. The heated purge stream may be passed through the adsorbent bed unit 606 to remove one or more contaminants from the adsorbent bed unit 606 and conducted away via conduit 608 as a purge product stream. The purge product stream may be subjected to conditioning and/or flared.

Figure 7:
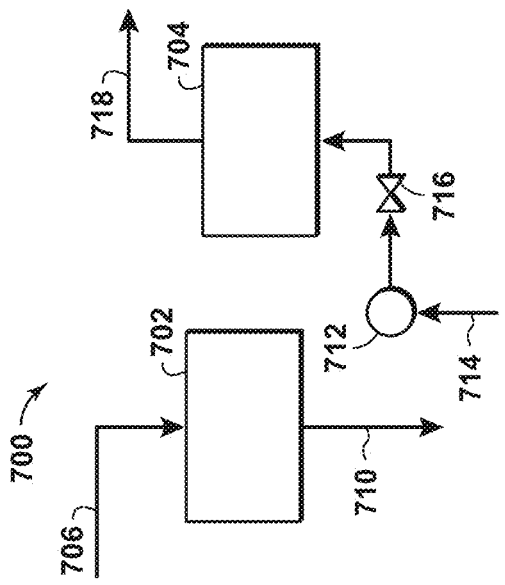
FIG. 7 is an exemplary diagram associated with another startup mode step in accordance with an embodiment of the present techniques.

FIG. 7 is an exemplary diagram 700 associated with another startup mode step in accordance with an embodiment of the present techniques. In this diagram 700, two adsorbent bed units 702 and 704 are shown performing different steps in the respective startup mode sequence after the product stream has reached a level that satisfies the predetermined threshold. This step may be performed in one or more cycles following performance of the cycles and may be used to startup the downstream processes, such as an NGL system. The first adsorbent bed unit 702 may be performing an adsorption step, while the second adsorbent bed unit 704 may be performing a regeneration step (e.g., a purge step). In the adsorption step, a feed stream may be passed via conduit 706 to first adsorbent bed unit 702. The feed stream may interact with the adsorbent bed within the first adsorbent bed unit 702 to remove one or more contaminants from the feed stream and the resulting stream may be conducted away to a downstream process via conduit 710. The external stream may pass to a heating unit 712 via conduit 714 for the regeneration step for the adsorbent bed unit 704. The heating unit 712 may be configured to heat external stream to a temperature, as noted above. Then, the heated stream may be passed to a depressurization unit 716. The depressurization unit 716 may be configured to lower the pressure of the heated stream to a pressure in the range between 0.1 bar absolute (bara) and 100 bara, which is lower than the pressure within the stream prior to the depressurization unit 716 or which may lower the pressure by at least 10%, by at least 20% or at least 30% relative to the pressure of the stream prior to the depressurization unit 716. Then, the resulting stream is passed from the depressurization unit 716 to the second adsorbent bed unit 704 as a purge stream during the regeneration step for the second adsorbent bed unit 704. The purge stream may be passed through the second adsorbent bed unit 704 to remove one or more contaminants from the adsorbent bed within the second adsorbent bed unit 704 and conducted away via conduit 718 as a purge product stream. The purge product stream may be intermingled with a fuel stream, subject to additional conditioning and/or flared.

Figure 8:
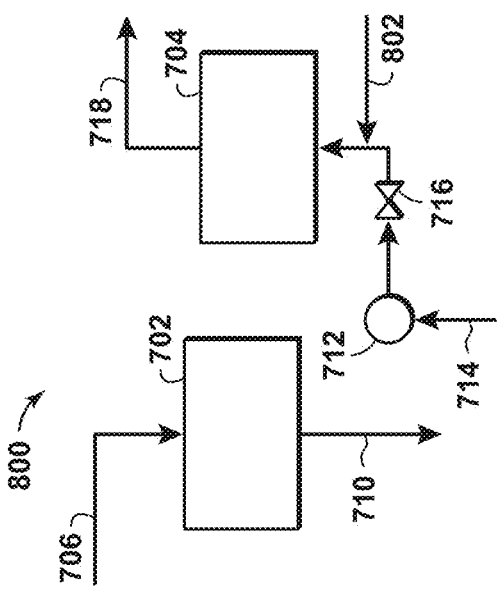
FIG. 8 is an exemplary diagram associated with still another startup mode step in accordance with an embodiment of the present techniques.

FIG. 8 is an exemplary diagram 800 associated with still another startup mode step in accordance with an embodiment of the present techniques. In this diagram 800, two adsorbent bed units 702 and 704 are shown performing different steps in the respective external startup mode sequence after the product stream has reached a level that satisfies the predetermined threshold and after the downstream process is providing a purge stream to the adsorbent bed units 702 and 704. This step may be performed in one or more cycles following performance of the cycles in FIG. 7, which may include similar reference numbers to FIG. 7, and may be used to transition to normal operation for the swing adsorption process and/or the downstream processes. In this configuration, the flow rate to the conduit 714 or a valve may be adjusted to decrease the amount of external gas being provided to the heating unit 712 via conduit 714 and the depressurization unit 716. The adjustment may be based on the volume of overhead stream being provided from the downstream process via conduit 802. The adjustment may include using a valve and/or control system in a cascaded configuration, adjusting the flow rate with a valve or blocking flow with one or more valves. This process may be utilized to transition the swing adsorption process from a RCTSA process to a RCPSA process. Also, this process may be used for the startup of an NGL process and/or LNG process.

Figure 9:
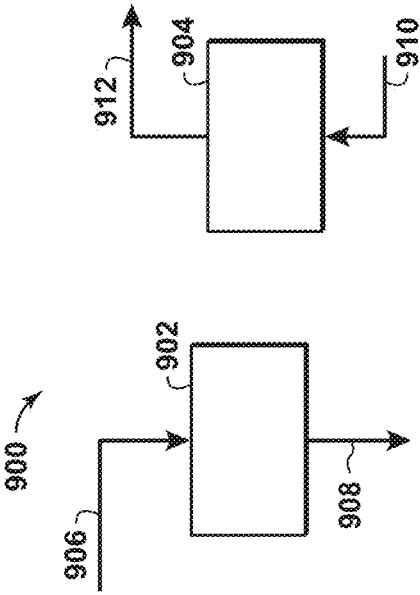
FIG. 9 is an exemplary diagram associated with normal operation mode.

FIG. 9 is an exemplary diagram 900 associated with normal operation mode. In this diagram 900, two adsorbent bed units 902 and 904 are shown performing different steps in the respective normal operation mode sequence after the startup mode is complete. The first adsorbent bed unit 902 may be performing an adsorption step, while the second adsorbent bed unit 904 may be performing a regeneration step (e.g., a purge step). In the adsorption step, a feed stream may be passed via conduit 906 to first adsorbent bed unit 902. The feed stream may interact with the adsorbent bed within the first adsorbent bed unit 902 to remove one or more contaminants from the feed stream and the resulting stream may be conducted away via a conduit 908 to a downstream process. For the regeneration step, the purge stream is passed via conduit 910 from the downstream process to the second adsorbent bed unit 904. The purge stream may be passed through the second adsorbent bed unit 904 to remove one or more contaminants from the adsorbent bed within the second adsorbent bed unit 904 and conducted away via conduit 912 as a purge product stream. The purge product stream may be intermingled with a fuel stream, provided to a residue gas compressor or other additional conditioning process.

As may be appreciated, the startup mode process may include various combination of steps to perform the startup mode process. The startup modes may use these different step to manage the startup mode sequence. For example, the blowdown step may be performed after the purge step for the respective adsorbent bed units.

In addition, as another enhancement, the present techniques may include other enhancements. For example, a heating jacket or blanket may be used to provide additional heat to the adsorbent bed unit. The additional heat may be used during startup mode to further provide heat to the adsorbent bed. Specifically, the heating jacket may be disposed adjacent to the adsorbent bed unit and/or manifolds and conduits fluidly coupled to the adsorbent bed unit and configured to heat the adsorbent bed, which may be an electric heating configuration.

In one or more embodiments, the material may include an adsorbent material supported on a non-adsorbent support. The adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups include primary, secondary, tertiary amines and other non protogenic basic groups such as amidines, guanidines and biguanides.

In one or more embodiments, the adsorbent bed unit may be utilized to separate contaminants from a feed stream during normal operation mode. The method may include passing a gaseous feed stream at a feed pressure through an adsorbent bed unit having an adsorbent contactor to separate one or more contaminants from the gaseous feed stream to form a product stream, wherein the adsorbent contactor has a first portion and a second portion; interrupting the flow of the gaseous feed stream; performing a depressurization step, wherein the depressurization step reduces the pressure within the adsorbent bed unit; performing an optional heating step, wherein the heating step increases the temperature of the adsorbent bed unit to form a temperature differential between the feed end of the adsorbent bed and the product end of the adsorbent bed; and performing a purge step, wherein the purge step reduces the pressure within the adsorbent bed unit; performing a re-pressurization step, wherein the re-pressurization step increases the pressure within the adsorbent bed unit; and repeating the steps a) to e) for at least one additional cycle.

Further, in one or more embodiments, the adsorbent bed unit may include an adsorbent bed that can be used for the separation of a target gas form a gaseous mixture. The adsorbent is usually comprised of an adsorbent material supported on a non-adsorbent support, or contactor. Such contactors contain substantially parallel flow channels wherein 20 volume percent, preferably 15 volume percent or less of the open pore volume of the contactor, excluding the flow channels, is in pores greater than about 20 angstroms. A flow channel is taken to be that portion of the contactor in which gas flows, if a steady state pressure difference is applied between the point or place at which a feed stream enters the contactor and the point or place at which a product stream leaves the contactor. In the contactor, the adsorbent is incorporated into the wall of the flow channel.

In one or more embodiments, when using RCTSA or an integrated RCPSA and RCTSA process, the total cycle times are typically less than 600 seconds, preferably less than 400 seconds, preferably less than 300 seconds, preferably less than 250 seconds, preferably less than 180 seconds, more preferably less than 90 seconds, and even more preferably less than 60 seconds. In other embodiment, the rapid cycle configuration may be operated at lower flow rates during startup mode as compared to normal operation mode, which may result in the cycle durations being longer than the cycle durations during normal operation mode. For example, the startup mode cycle duration may be for a period greater than 1 second and less than 2400 seconds, for a period greater than 1 second and less than 1500 seconds, for a period greater than 1 second and less than 1000 seconds, for a period greater than 1 second and less than 600 seconds, for a period greater than 2 second and less than 800 seconds, for a period greater than 2 second and less than 400 seconds, for a period greater than 5 second and less than 150 seconds or for a period greater than 5 second and less than 90 seconds.

In view of the many possible embodiments to which the principles of the disclosed invention may be applied, it should be recognized that the illustrative embodiments are only preferred examples of the invention and should not be taken as limiting the scope of the invention.

What is claimed is:

1. A cyclical swing adsorption system comprising:
a plurality of manifolds, wherein the plurality of manifolds comprise a feed manifold configured to pass a gaseous feed stream to a plurality of adsorbent bed units during an adsorption step, a product manifold configured to pass a product stream from the plurality of adsorbent bed units during the adsorption step, a purge manifold configured to pass a purge stream to the plurality of adsorbent bed units during a regeneration step, a purge product manifold configured to pass a purge product stream from the plurality of adsorbent bed units during the regeneration step,
each manifold of the plurality of manifolds is associated with one swing adsorption process step of a plurality of swing adsorption process steps;
the plurality of adsorbent bed units coupled to the plurality of manifolds, each of the adsorbent bed units comprising:
a housing;
an adsorbent material disposed within the housing;
a plurality of valves, wherein at least one of the plurality of valves is associated with one of the plurality of manifolds and is configured to manage fluid flow along a flow path extending between the respective manifold and the adsorbent material;
an external gas bypass valve in fluid communication with the purge manifold and configured to provide a flow passage for an external gas stream from an external gas storage vessel to the purge manifold in a startup mode position and configured to block the flow passage of the external gas stream from the external gas storage vessel to the purge manifold in a normal operation mode position.

2. The cyclical swing adsorption system of claim 1, wherein the plurality of valves comprise one or more poppet valves.

3. The cyclical swing adsorption system of claim 1, wherein the plurality of adsorbent bed units are configured to operate at pressures between 0.1 bar absolute (bara) and 100 bara.

4. The cyclical swing adsorption system of claim 1, further comprising a heating unit disposed upstream of the purge manifold and downstream of the external gas storage vessel, wherein the heating unit is configured to heat the external gas stream to a temperature in the range between a temperature in the range between 450° F. and the temperature of the gaseous feed stream.

5. The cyclical swing adsorption system of claim 1, further comprising a heating unit disposed upstream of the purge manifold and downstream of the external gas storage vessel, wherein the heating unit is configured to heat the external gas stream to a temperature in the range between a temperature in the range between 500° F. and greater than 50° F. of the temperature of the gaseous feed stream.

6. The cyclical swing adsorption system of claim 1, further comprising a conditioning unit disposed downstream of the purge product manifold and upstream of the external gas storage vessel, wherein the conditioning unit is configured to remove one or more contaminants from the purge product stream.

7. The cyclical swing adsorption system of claim 1, wherein the plurality of manifolds further comprise a blowdown manifold configured to pass a blowdown stream from the plurality of adsorbent bed units during a blowdown step.

8. The cyclical swing adsorption system of claim 1, further comprising a liquefied natural gas process unit in fluid communication with the adsorbent bed unit and configured to receive the product stream and separate the product stream into a final product stream and a flash fuel stream, wherein the flash fuel stream is passed to the purge manifold.

9. The cyclical swing adsorption system of claim 1, further comprising a cryogenic natural gas liquid recovery (NGL) process unit in fluid communication with the adsorbent bed unit and configured to receive the product stream and separate the product stream into a final product stream and a residue gas stream, wherein the residue gas stream is passed to the purge manifold.

10. The cyclical swing adsorption system of claim 9, configured to recycle a demethanizer column overhead product with the residue gas stream.

11. The cyclical swing adsorption system of claim 1, further comprising a heating jacket disposed adjacent to the adsorbent bed unit and configured to heat the adsorbent bed.

12. The cyclical swing adsorption system of claim 1, configured to pass the purge product stream to a suction of a residue gas compressor and combine the purge product stream with the feed stream either upstream or downstream of a triethylene glycol (TEG) based dehydration unit before passing the feed stream to the feed manifold.

13. The cyclical swing adsorption system of claim 1, configured to adjust the amount of external gas stream to the purge manifold.

14. The cyclical swing adsorption system of claim 1, configured to pass the purge stream to the plurality of adsorbent bed units in a countercurrent direction relative to the direction of the gaseous feed stream and to obtain a temperature differential at the end of a purge step in a range between 100° F. and 400° F., wherein the temperature differential is the difference in temperatures between a feed end of the adsorbent bed and a product end of the adsorbent bed.

15. The cyclical swing adsorption system of claim 1, configured to operate on a cycle duration of greater than 2 seconds and less than 800 seconds.

* * * * *